(12) United States Patent
Cheng

(10) Patent No.: US 11,888,322 B2
(45) Date of Patent: Jan. 30, 2024

(54) PHOTOVOLTAIC SYSTEM AND MAXIMUM POWER POINT TRACKING CONTROL METHOD FOR PHOTOVOLTAIC SYSTEM

(71) Applicant: Huawei Digital Power Technologies Co., Ltd., Shenzhen (CN)

(72) Inventor: Binjie Cheng, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/853,324

(22) Filed: Jun. 29, 2022

(65) Prior Publication Data

US 2023/0006449 A1 Jan. 5, 2023

(30) Foreign Application Priority Data

Jun. 30, 2021 (CN) .......................... 202110737375.6

(51) Int. Cl.
*H02J 1/10* (2006.01)
*H02J 3/38* (2006.01)
*H02M 7/537* (2006.01)

(52) U.S. Cl.
CPC ............. *H02J 3/381* (2013.01); *H02M 7/537* (2013.01); *H02J 2300/26* (2020.01)

(58) Field of Classification Search
CPC ............................... H02J 3/381; H02J 2300/26
See application file for complete search history.

(56) References Cited

U.S. PATENT DOCUMENTS

| 5,869,956 | A | 2/1999 | Nagao et al. | |
| 7,158,395 | B2 * | 1/2007 | Deng | ........................ G05F 1/67 363/95 |
| 2013/0026840 | A1 | 1/2013 | Arditi et al. | |

(Continued)

FOREIGN PATENT DOCUMENTS

| CN | 101873091 A | 10/2010 |
| CN | 102594211 A | 7/2012 |

(Continued)

*Primary Examiner* — Jared Fureman
*Assistant Examiner* — Esayas G Yeshaw
(74) *Attorney, Agent, or Firm* — Rimon PC

(57) ABSTRACT

This application provides a photovoltaic system and a maximum power point tracking control method for a photovoltaic system. The photovoltaic system includes an MPPT controller and a power converter, and the MPPT controller is connected to the power converter. The MPPT controller is configured to: be connected to a photovoltaic array, and track a global maximum power point MPP of the photovoltaic array. The MPPT controller may be further configured to obtain, when there is a periodic shade for the photovoltaic array, a multi-peak search start moment of global MPPT of the photovoltaic array based on a status of tracking the global MPP of the photovoltaic array in a target time period, so that when the multi-peak search start moment in each MPPT period arrives, the global MPPT of the photovoltaic array is started, to output a working point of the global MPP of the photovoltaic array to the power converter. According to this application, efficiency of obtaining the working point of the global MPP of the photovoltaic array can be improved, and precision of controlling the global MPPT of the photovoltaic array can be improved.

20 Claims, 7 Drawing Sheets

(56) References Cited

U.S. PATENT DOCUMENTS

2014/0001864 A1* 1/2014 Nirantare .......... H01L 31/02021
                                                          307/71
2020/0303924 A1* 9/2020 Moslehi ................. H02J 3/381

FOREIGN PATENT DOCUMENTS

| CN | 103955253 A | 7/2014 |
| CN | 105574612 A | 5/2016 |
| CN | 107168447 A | 9/2017 |
| CN | 109710021 A | 5/2019 |
| CN | 109814651 A | 5/2019 |
| CN | 112491142 A | 3/2021 |
| CN | 112862626 A | 5/2021 |
| JP | 2013218503 A | 10/2013 |

* cited by examiner

PHOTOVOLTAIC SYSTEM AND MAXIMUM POWER POINT TRACKING CONTROL METHOD FOR PHOTOVOLTAIC SYSTEM

CROSS-REFERENCE TO RELATED APPLICATION

This application claims priority to Chinese Patent Application No. 202110737375.6, filed on Jun. 30, 2021, which is hereby incorporated by reference in its entirety.

TECHNICAL FIELD

This application relates to the field of power electronics technologies, and in particular, to a photovoltaic system and a maximum power point tracking control method for a photovoltaic system.

BACKGROUND

New energy (NE, which may also be referred to as non-conventional energy) plays a wide range of roles in people's lives and work, and one challenge is to convert new energy into electric energy. New energy may include solar energy, geothermal energy, wind energy, ocean energy, biomass energy, or another new energy. Solar photovoltaic power generation is considered to be the most promising new energy technology in the world at present. All developed countries have invested huge amounts to compete for research and development, actively promoted the industrialization process, and vigorously explored market applications. However, there are many problems in development of the photovoltaic power generation industry: high costs of photovoltaic modules, relatively low photoelectric conversion efficiency, and harm of partial shading. Maximum power point tracking (MPPT) is the most direct and effective method to reduce power generation costs and improve power generation efficiency. In an actual process of using a photovoltaic system, a photovoltaic array is usually affected by a surrounding environment (dark clouds in the sky, a tree, a high-rise building, and dust), and consequently there is uneven light intensity for the photovoltaic array, resulting in a partial shading problem. When the photovoltaic array is partially shaded, a power-voltage characteristic curve (which may be referred to as a P-U curve for ease of description) output by the photovoltaic array exhibits a plurality of peak characteristics. For the P-U characteristic curve with a plurality of peak characteristics, if a global maximum power point (MPP) cannot be found and the photovoltaic system runs at a local MPP, there is a loss of energy yield in the photovoltaic system. Factors of finding the global MPP include an effect of a multi-peak MPPT algorithm and a start moment of multi-peak MPPT.

The inventor of this application finds in a process of research and experimentation that in the conventional technology, when the photovoltaic array in the photovoltaic system outputs a P-U curve having a multi-peak form (namely, a P-U curve that has a plurality of peak characteristics) due to partial shading, the photovoltaic system may quickly cross, by using a method such as introducing a power curve, an area in which there is a relatively low probability that a maximum power point appears. In this way, the photovoltaic system may still quickly track global maximum power even when the local maximum power point appears. However, in the conventional technology, a start moment of the multi-peak MPPT algorithm of the photovoltaic system is determined based on human experience, there is a high probability that selection of the start moment of the multi-peak MPPT algorithm deviates from an actual moment at which a plurality of peaks appear, and there is a high probability that there is a loss of energy yield in the photovoltaic system. The operation is inflexible and there is poor applicability.

SUMMARY

This application provides a photovoltaic system and a maximum power point tracking control method for a photovoltaic system, to improve efficiency of obtaining a working point of a global MPP of a photovoltaic array, and improve precision of controlling global MPPT of the photovoltaic array. Operation of the photovoltaic system is simple and the system has high applicability.

According to a first aspect, this application provides a photovoltaic system. The photovoltaic system includes an MPPT controller and a power converter. The MPPT controller is connected to the power converter. Herein, the MPPT controller may be configured to: be connected to a photovoltaic array, and track a global MPP of the photovoltaic array. The MPPT controller may be further configured to obtain, when there is a periodic shade for the photovoltaic array, a multi-peak search start moment of global MPPT of the photovoltaic array based on a status of tracking the global MPP of the photovoltaic array in a target time period. Herein, the target time period includes a plurality of MPPT periods. The MPPT period may be one day. For example, the MPPT period is 24 hours that last from 0 clock to 24 clock every day. In other words, the MPPT controller may obtain, when there is a periodic shade for the photovoltaic array, the multi-peak search start moment of the global MPPT of the photovoltaic array based on a status (including whether the global MPP of the photovoltaic array is tracked in a plurality of consecutive periods, in other words, whether there are a plurality of periodic peaks) of tracking the global MPP of the photovoltaic array in the plurality of MPPT periods. In an application scenario in which there is a periodic shade for the photovoltaic array, a plurality of peaks usually appear in a P-U curve of the photovoltaic array at a periodic moment. For example, a plurality of peaks repeatedly appear at about a specific moment every day. Therefore, the global MPPT of the photovoltaic array may be periodically tracked to determine whether there is a periodic shade, to predict a future moment at which a plurality of peaks appear, and multi-peak search of the photovoltaic array is started at the predicted moment. In this way, efficiency of the global MPPT of the photovoltaic array may be improved. Optionally, after the plurality of MPPT periods, the MPPT controller may start the global MPPT of the photovoltaic array when the multi-peak search start moment in each MPPT period arrives, and output a working point of the global MPP in each MPPT period to the power converter when tracking the global MPP in each MPPT period. In this way, precision of obtaining the multi-peak search start moment of the global MPPT of the photovoltaic array may be improved, and efficiency of searching for the working point of the global MPP of the photovoltaic array may be improved, and therefore precision of controlling the global MPPT of the photovoltaic array may be improved, to ensure an energy yield in the photovoltaic system. Operation of the photovoltaic system is simple and the system has high applicability.

With reference to the first aspect, in a first possible implementation, the plurality of MPPT periods include a first MPPT period and N second MPPT periods before the first MPPT period, where N is a natural number greater than 1; the MPPT controller may be configured to: start the global MPPT of the photovoltaic array when a first multi-peak search start moment in the first MPPT period arrives, and obtain a multi-peak search time period for a periodic shade based on the first multi-peak search start moment when tracking a first global MPP of the photovoltaic array in the first MPPT period; and the MPPT controller is further configured to obtain, when there is a periodic shade for the photovoltaic array, the multi-peak search start moment of the global MPPT of the photovoltaic array based on a status of tracking the global MPP of the photovoltaic array in the multi-peak search time period in each second MPPT period. Herein, the first MPPT period may be a current period in which the global MPPT of the photovoltaic array is started, and the first multi-peak search start moment may be a multi-peak search start moment set based on experience or experimental data. This may be specifically determined based on an actual application scenario. This is not limited herein. Herein, the multi-peak search time period for a periodic shade may be a time period that is used to evaluate whether there is a periodic shade for the photovoltaic array and that is used to predict appearance of a plurality of peaks. In this application, the MPPT controller may determine the multi-peak search time period for a periodic shade based on the first multi-peak search start moment, and obtain, when there is a periodic shade for the photovoltaic array, the multi-peak search start moment of the global MPPT of the photovoltaic array based on the status of tracking the global MPP of the photovoltaic array in the multi-peak search time period in each second MPPT period. Herein, the status of tracking the global MPP of the photovoltaic array may include whether the global MPP of the photovoltaic array is tracked and a quantity of second MPPT periods, in the N second MPPT periods, in which the global MPP of the photovoltaic array is tracked. It may be understood that the MPPT controller may output, based on an actual application status of tracking the global MPP of the photovoltaic array in the N second MPPT periods, whether there is a periodic shade for the photovoltaic array, and may further obtain the multi-peak search start moment of the global MPPT of the photovoltaic array when there is a periodic shade for the photovoltaic array.

With reference to the first possible implementation of the first aspect, in a second possible implementation, the MPPT controller is further configured to obtain the multi-peak search start moment of the global MPPT of the photovoltaic array when the quantity E of second MPPT periods in which the global MPP of the photovoltaic array is tracked is greater than or equal to M. Herein, M is a natural number less than N. For example, a value of N may be 5, a value of M may be 3, and a value of the MPPT period may be one day. The value of N and the value of M may be set based on an actual application scenario. This is not limited herein. Based on the settings of N and M, it may be implemented that when determining that the quantity E of second MPPT periods in which the global MPP of the photovoltaic array is tracked is greater than or equal to M, the MPPT controller obtains a proportion or a probability of tracking the global MPP of the photovoltaic array in the N second MPPT periods, and therefore may obtain, based on the proportion or the probability of tracking the global MPP of the photovoltaic array, information indicating that there is a periodic shade for the photovoltaic array. In other words, if the global MPP of the photovoltaic array may be tracked in at least M of the N second MPPT periods, it may be considered that there are a plurality of periodic peaks in the output of the photovoltaic array in the multi-peak search time period. In this case, it may be considered that there is a periodic shade for the photovoltaic array, and then the multi-peak search start moment of the global MPPT of the photovoltaic array may be obtained. It may be understood that in the application scenario in which there is a periodic shade for the photovoltaic array, even if there is a same periodic shade for a same photovoltaic array, in different seasons or different multi-peak search time periods, there may be different quantities of second MPPT periods, in the N second MPPT periods, in which the global MPP of the photovoltaic array is tracked. Therefore, based on the settings of N and M, it may be implemented that setting of the proportion or the probability of tracking the global MPP of the photovoltaic array is closer to an actual application scenario. Operation of the photovoltaic system is simple and the system has high applicability.

With reference to the first possible implementation of the first aspect, in a third possible implementation, the MPPT controller is configured to obtain the multi-peak search time period for a periodic shade based on a duration Tw before the first multi-peak search start moment and a duration Tw after the first multi-peak search start moment. Herein, Tw may be set based on an actual application scenario, or may be determined based on prior multi-peak search experience of a photovoltaic array. This is not limited herein. For example, when a value of N is 5, a value of M is 3, and a value of the MPPT period is one day, a value of Tw may be 15 minutes. In other words, the MPPT controller may obtain 30 minutes, namely, a sum of 15 minutes and 15 minutes respectively before and after the first multi-peak search start moment, and use the 30 minutes as the multi-peak search time period for a periodic shade. In this way, a probability of tracking the global MPP in the multi-peak search time period may be increased, and tracking effectiveness of tracking the global MPP based on multi-peak search may be improved. Operation of the photovoltaic system is simple and the system has high applicability.

With reference to the second possible implementation of the first aspect, in a fourth possible implementation, the MPPT controller may be configured to: obtain E tracking moments, in the multi-peak search time periods in the E second MPPT periods, at which the global MPP of the photovoltaic array is tracked, and obtain an initial multi-peak search start moment of the global MPPT of the photovoltaic array based on the E tracking moments; and the MPPT controller is further configured to: start the global MPPT of the photovoltaic array when the initial multi-peak search start moment in a next MPPT period of the first MPPT period arrives, and obtain the multi-peak search start moment of the global MPPT of the photovoltaic array based on a moment at which the global MPPT of the photovoltaic array is tracked. In other words, when there is a periodic shade for the photovoltaic array, the MPPT controller obtains the initial multi-peak search start moment based on tracking moments at which a plurality of global MPPs are tracked when there is a periodic shade, and then starts the global MPPT of the photovoltaic array in the next MPPT period based on the initial multi-peak search start moment, to further correct the multi-peak search start moment based on a result of the global MPPT of the photovoltaic array, so that the multi-peak search is started in a subsequent MPPT period based on a corrected multi-peak search start moment, to improve effectiveness of tracking the global MPP of the photovoltaic array and improve efficiency and accuracy of the global MPPT of the photovoltaic array.

With reference to the fourth possible implementation of the first aspect, in a fifth possible implementation, the MPPT controller may be configured to obtain the initial multi-peak search start moment of the global MPPT of the photovoltaic array based on a target moment T before a median moment Tm of the E tracking moments. Herein, a time length between the target moment T and the median moment Tm is a duration Ts. In other words, in this application, the MPPT controller may obtain a moment that is earlier than Tm by the duration Ts, and use the moment as an initial value of the initial multi-peak search start moment. Tm is a median of the E tracking moments, and therefore effectiveness and applicability of the initial multi-peak search start moment may be ensured, and a probability of tracking the global MPPT of the photovoltaic array may be increased, to ensure efficiency of tracking the global MPP of the photovoltaic array.

With reference to the fifth possible implementation of the first aspect, in a sixth possible implementation, the MPPT controller is further configured to: when starting the global MPPT of the photovoltaic array at the initial multi-peak search start moment in the next MPPT period of the first MPPT period and tracking no global MPPT of the photovoltaic array, update the initial multi-peak search start moment based on preset start delay duration Tb until the global MPPT of the photovoltaic array is started at an updated initial multi-peak search start moment and the global MPP of the photovoltaic array is tracked, where Tb is less than Ts. Herein, if the initial multi-peak search start moment is T, the initial value of T is Tm−Ts. If starting the global MPPT of the photovoltaic array at the initial multi-peak search start moment T and tracking no global MPPT of the photovoltaic array, the MPPT controller may update the initial multi-peak search start moment T based on a formula T=T+Tb until the global MPPT of the photovoltaic array is started at the updated initial multi-peak search start moment and the global MPP of the photovoltaic array is tracked. In this way, it may be ensured that the initial multi-peak search start moment is closer to the actual multi-peak search start moment at which the global MPP of the photovoltaic array is tracked, to ensure accuracy of a finally determined multi-peak search start moment.

With reference to the sixth possible implementation of the first aspect, in a seventh possible implementation, the MPPT controller is configured to obtain the multi-peak search start moment of the global MPPT of the photovoltaic array based on a moment, in the next MPPT period of the first MPPT period, at which the global MPPT of the photovoltaic array is tracked. Herein, a target MPPT period is a next MPPT period of the next MPPT period. In this application, after the initial multi-peak search start moment of the global MPPT of the photovoltaic array is obtained, when the next MPPT period arrives, effectiveness of tracking the global MPP of the photovoltaic array by starting the global MPPT of the photovoltaic array based on the initial multi-peak search start moment may be further verified, so that when the global MPP of the photovoltaic array is tracked, the actual moment at which the global MPP of the photovoltaic array is tracked may be used as the multi-peak search start moment of the global MPPT of the photovoltaic array, to further ensure accuracy of setting the multi-peak search start moment and ensure efficiency of tracking the global MPP of the photovoltaic array.

With reference to any one of the first aspect to the seventh possible implementation of the first aspect, in an eighth possible implementation, the photovoltaic system further includes a combiner box, the photovoltaic array is connected to the power converter by using the combiner box, and the power converter is connected to a load.

With reference to any one of the eighth possible implementations of the first aspect, in a ninth possible implementation, the photovoltaic system further includes a direct current bus, the photovoltaic array is connected to the direct current bus by using the combiner box, and the direct current bus is connected to the load by using the power converter.

With reference to any one of the ninth possible implementations of the first aspect, in a tenth possible implementation, the power converter is a photovoltaic inverter, and the load includes a grid-connected/off-grid junction box, an alternating current load, and/or an alternating current grid.

With reference to any one of the ninth possible implementations of the first aspect, in an eleventh possible implementation, the power converter is a direct current DC/DC converter, and the load includes a direct current load and/or an energy storage battery.

With reference to any one of the ninth possible implementations of the first aspect, in a twelfth possible implementation, the power converter is a DC/DC converter, the photovoltaic array is connected to the DC/DC converter by using the combiner box, the DC/DC converter is connected to the load by using the direct current bus, and the load includes a photovoltaic inverter and/or an energy storage battery.

In this application, functional modules in the photovoltaic system are composed in diversified and flexible manners, and the power converter is represented in diversified manners, and therefore diversity of application scenarios of the photovoltaic system may be improved, and adaptability of the photovoltaic system may be enhanced.

According to a second aspect, this application provides a maximum power point tracking MPPT control method for a photovoltaic system. The method is applicable to an MPPT controller in the photovoltaic system. The photovoltaic system further includes a photovoltaic array and a power converter. The MPPT controller is connected to the photovoltaic array and the power converter. In the method, the MPPT controller may obtain a status of tracking a global MPP of the photovoltaic array in a target time period. Herein, the target time period may include a plurality of MPPT periods. In other words, the target time period herein is a time period that includes a plurality of MPPT periods. The MPPT controller may obtain, when there is a periodic shade for the photovoltaic array, a multi-peak search start moment of global MPPT of the photovoltaic array based on the status of tracking the global MPP of the photovoltaic array in the target time period, so that when the multi-peak search start moment in each MPPT period arrives, the global MPPT of the photovoltaic array is started, to output a working point of the global MPP of the photovoltaic array to the power converter. Based on this application, precision of obtaining the multi-peak search start moment of the global MPPT of the photovoltaic array may be improved, and efficiency of searching for the working point of the global MPP of the photovoltaic array may be improved, and therefore precision of controlling the global MPPT of the photovoltaic array may be improved, to ensure an energy yield in the photovoltaic system. Operation of the photovoltaic system is simple and the system has high applicability.

With reference to the second aspect, in a first possible implementation, the plurality of MPPT periods include a first MPPT period and N second MPPT periods before the first MPPT period, where N is a natural number greater than 1; the MPPT controller may start the global MPPT of the photovoltaic array when a first multi-peak search start moment in the first MPPT period arrives, and obtain a multi-peak search time period for a periodic shade based on the first multi-peak search start moment when tracking a first global MPP of the photovoltaic array in the first MPPT period; and the MPPT controller may obtain a status of tracking the global MPP of the photovoltaic array in the multi-peak search time period in each second MPPT period. Herein, the status of tracking the global MPP of the photovoltaic array includes a quantity of second MPPT periods in which the global MPP of the photovoltaic array is tracked. In this application, the MPPT controller may obtain, based on an actual application status of tracking the global MPP of the photovoltaic array in the N second MPPT periods, information indicating whether there is a periodic shade for the photovoltaic array. Operation of the photovoltaic system is simple and the system has high applicability.

With reference to the first possible implementation of the second aspect, in a second possible implementation, a specific implementation of obtaining the multi-peak search start moment of the global MPPT of the photovoltaic array when there is a periodic shade for the photovoltaic array may include: A quantity of second MPPT periods, in the N second MPPT periods, in which the global MPP of the photovoltaic array is tracked is obtained; and when the quantity E of second MPPT periods in which the global MPP of the photovoltaic array is tracked is greater than M, it may be considered or obtained that there is a periodic shade for the photovoltaic array, and in this case, the multi-peak search start moment of the global MPPT of the photovoltaic array may be obtained. Herein, M is a natural number less than N. In other words, if the global MPP of the photovoltaic array may be tracked in at least M of the N second MPPT periods, it may be considered that there are a plurality of periodic peaks in output of the photovoltaic array in the multi-peak search time period. In this case, it may be considered that there is a periodic shade for the photovoltaic array. Based on setting of N and M, it may be implemented that when determining that the quantity E of second MPPT periods in which the global MPP of the photovoltaic array is tracked is greater than or equal to M, the MPPT controller determines a proportion or a probability of tracking the global MPP of the photovoltaic array in the N second MPPT periods, and therefore may obtain, based on the proportion or the probability of tracking the global MPP of the photovoltaic array, information indicating that there is a periodic shade for the photovoltaic array. In this case, the multi-peak search start moment of the global MPPT of the photovoltaic array may be obtained. Operation of the photovoltaic system is simple and the system has high applicability.

With reference to the first possible implementation of the second aspect or the second possible implementation of the second aspect, in a third possible implementation, a specific implementation of obtaining the multi-peak search time period for a periodic shade based on the first multi-peak search start moment may include: obtaining the multi-peak search time period for a periodic shade based on a duration Tw before the first multi-peak search start moment and duration Tw after the first multi-peak search start moment. Herein, Tw may be set based on an actual application scenario, or may be determined based on prior multi-peak search experience of a photovoltaic array. This is not limited herein. For example, when a value of N is 5, a value of M is 3, and a value of the MPPT period is one day, a value of Tw may be 15 minutes. In other words, the MPPT controller may obtain 30 minutes, namely, a sum of 15 minutes and 15 minutes respectively before and after the first multi-peak search start moment, and use the 30 minutes as the multi-peak search time period for a periodic shade. In this way, a probability of tracking the global MPP in the multi-peak search time period may be increased, and tracking effectiveness of tracking the global MPP based on multi-peak search may be improved. Operation of the photovoltaic system is simple and the system has high applicability.

With reference to the second possible implementation of the second aspect or the third possible implementation of the second aspect, in a fourth possible implementation, a specific implementation of obtaining the multi-peak search start moment of the global MPPT of the photovoltaic array may include: E tracking moments in the E second MPPT periods are obtained. It may be understood that the tracking moment herein is a moment, in the multi-peak search time period in the second MPPT period, at which the global MPP of the photovoltaic array is tracked. In addition, the MPPT controller may obtain an initial multi-peak search start moment of the global MPPT of the photovoltaic array based on the E tracking moments, start the global MPPT of the photovoltaic array when the initial multi-peak search start moment in a next MPPT period of the first MPPT period arrives, and obtain the multi-peak search start moment of the global MPPT of the photovoltaic array based on a moment at which the global MPPT of the photovoltaic array is tracked. In other words, when there is a periodic shade for the photovoltaic array, the MPPT controller obtains the initial multi-peak search start moment based on tracking moments at which a plurality of global MPPs are tracked when there is a periodic shade, and then starts the global MPPT of the photovoltaic array in the next MPPT period based on the initial multi-peak search start moment, to correct the multi-peak search start moment, so that the multi-peak search is started in a subsequent MPPT period based on a corrected multi-peak search start moment, to improve effectiveness of tracking the global MPP of the photovoltaic array and improve efficiency and accuracy of the global MPPT of the photovoltaic array.

With reference to the fourth possible implementation of the second aspect, in a fifth possible implementation, a specific implementation of obtaining, by the MPPT controller, the initial multi-peak search start moment of the global MPPT of the photovoltaic array based on the E tracking moments may include: obtaining the initial multi-peak search start moment of the global MPPT of the photovoltaic array based on a target moment T before a median moment Tm of the E tracking moments. Herein, a time length between the target moment T and the median moment Tm is a duration Ts, and Ts is greater than Tb. In this application, the MPPT controller may obtain a moment that is earlier than Tm by the duration Ts, and use the moment as an initial value of the initial multi-peak search start moment. Tm is a median of the E tracking moments, and therefore effectiveness and applicability of the initial multi-peak search start moment may be ensured, and a probability of tracking the global MPPT of the photovoltaic array may be increased, to ensure efficiency of tracking the global MPP of the photovoltaic array.

With reference to the fifth possible implementation of the second aspect, in a sixth possible implementation, that the MPPT controller obtains the multi-peak search start moment of the global MPPT of the photovoltaic array based on a moment at which the global MPPT of the photovoltaic array is tracked is that the multi-peak search start moment of the global MPPT of the photovoltaic array may be directly obtained based on a moment, in the next MPPT period of the first MPPT period, at which the global MPPT of the photovoltaic array is tracked. A target MPPT period is a next MPPT period of the next MPPT period. In this application, after the initial multi-peak search start moment of the global MPPT of the photovoltaic array is obtained, when the next MPPT period arrives, effectiveness of tracking the global MPP of the photovoltaic array by starting the global MPPT of the photovoltaic array based on the initial multi-peak search start moment may be further verified, so that when the global MPP of the photovoltaic array is tracked, the actual moment at which the global MPP of the photovoltaic array is tracked may be used as the multi-peak search start moment of the global MPPT of the photovoltaic array, to further ensure accuracy of setting the multi-peak search start moment and ensure efficiency of tracking the global MPP of the photovoltaic array.

With reference to the sixth possible implementation of the second aspect, in a seventh possible implementation, if starting the global MPPT of the photovoltaic array at the initial multi-peak search start moment in the next MPPT period of the first MPPT period and tracking no global MPPT of the photovoltaic array, the MPPT controller may further update the initial multi-peak search start moment based on a preset start delay duration Tb until the global MPPT of the photovoltaic array is started at an updated initial multi-peak search start moment and the global MPP of the photovoltaic array is tracked. Herein, if the initial multi-peak search start moment is T, the initial value of T is Tm−Ts. If starting the global MPPT of the photovoltaic array at the initial multi-peak search start moment T and tracking no global MPPT of the photovoltaic array, the MPPT controller may update the initial multi-peak search start moment T based on a formula 1 (namely, a formula T=T+ Tb) until the global MPPT of the photovoltaic array is started at the updated initial multi-peak search start moment and the global MPP of the photovoltaic array is tracked. In this way, it may be ensured that the initial multi-peak search start moment is closer to the actual multi-peak search start moment at which the global MPP of the photovoltaic array is tracked, to ensure accuracy of a finally determined multi-peak search start moment.

DESCRIPTION OF EMBODIMENTS

Solar energy is inexhaustible and pollution-free green energy given by nature, in other words, solar energy is clean and renewable energy, and plays a wide range of roles in people's lives and work. Solar energy needs to be converted into electric energy. Solar power generation may be classified into photothermal power generation and photovoltaic power generation. A photovoltaic system provided in this application may be based on solar photovoltaic power generation. Solar photovoltaic power generation features an absence of moving parts, noise, and pollution and has high reliability, and has extensive application prospects in communication photovoltaic systems in remote areas.

Figure 1:
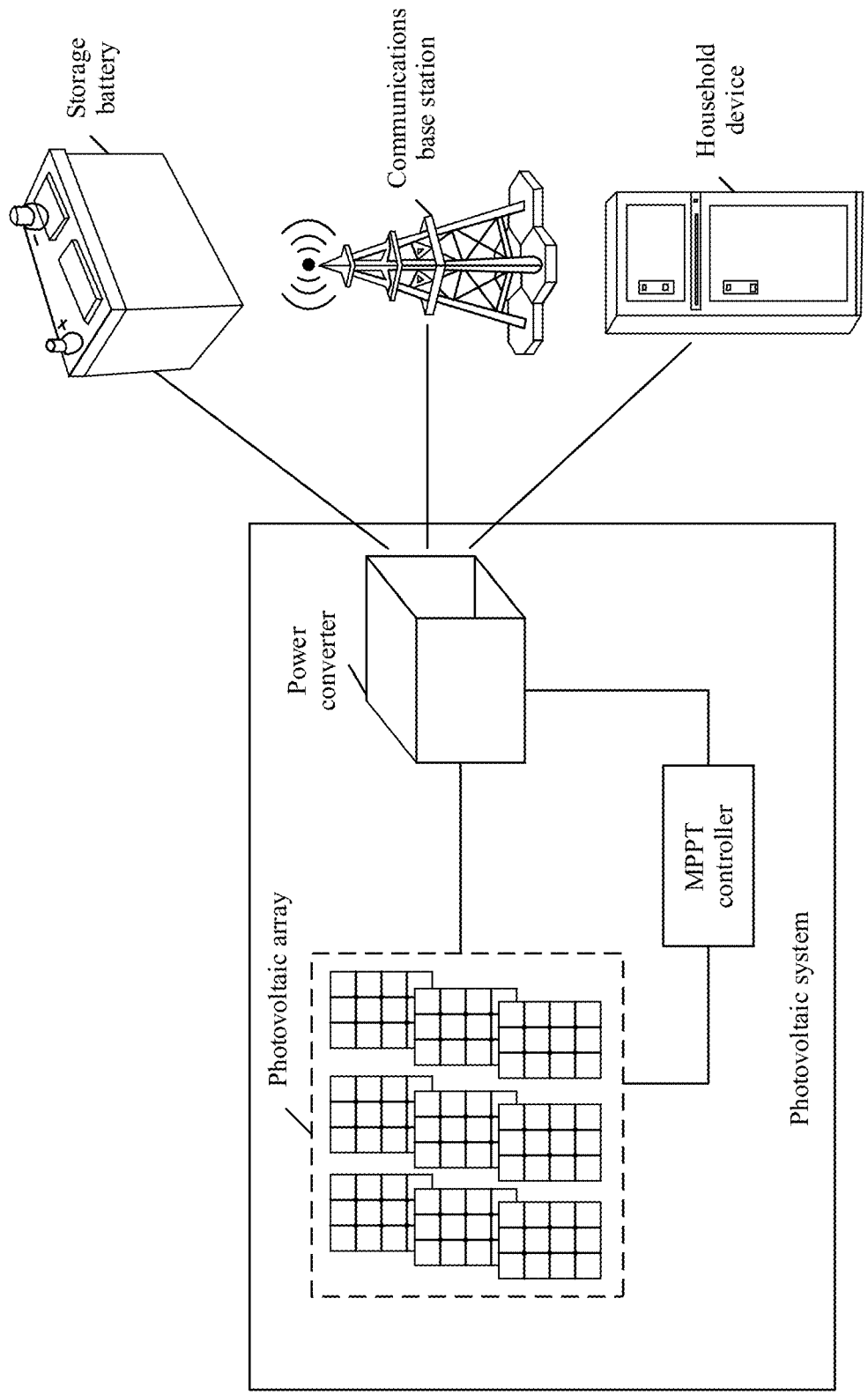
FIG. 1 is a schematic diagram of an application scenario of a photovoltaic system according to an embodiment of this application.

The photovoltaic system provided in this application is applicable to supplying power to a plurality of types of electric devices such as a base station device with no mains power or poor mains power in a remote area, a storage battery, or a household device (for example, a refrigerator or an air conditioner) in an alternating current grid. This may be specifically determined based on an actual application scenario. This is not limited herein. FIG. 1 is a schematic diagram of an application scenario of a photovoltaic system according to an embodiment of this application. As shown in FIG. 1, the photovoltaic system may include a photovoltaic array, a power converter, and an MPPT controller. The photovoltaic array may be connected to a load by using the power converter, and the MPPT controller is connected to the photovoltaic array and the power converter. The photovoltaic array may convert solar light energy into direct current electric energy by using the photovoltaic effect. The power converter may convert a direct current output by the photovoltaic array into a direct current at a corresponding power, and output the direct current to a direct current load such as a storage battery for use, or convert a direct current output by the photovoltaic array into an alternating current for use by an alternating current load such as a communications base station or a household device in an alternating current grid. The MPPT controller may track a global MPP of the photovoltaic array, and output a working point of the global MPP to the power converter, so that the photovoltaic system works at the global MPP, to ensure an energy yield in the photovoltaic system.

With reference to FIG. 2 to FIG. 8, the photovoltaic system, an MPPT controller, and an MPPT control method for a photovoltaic system provided in this application are described below by using examples.

Figure 2:
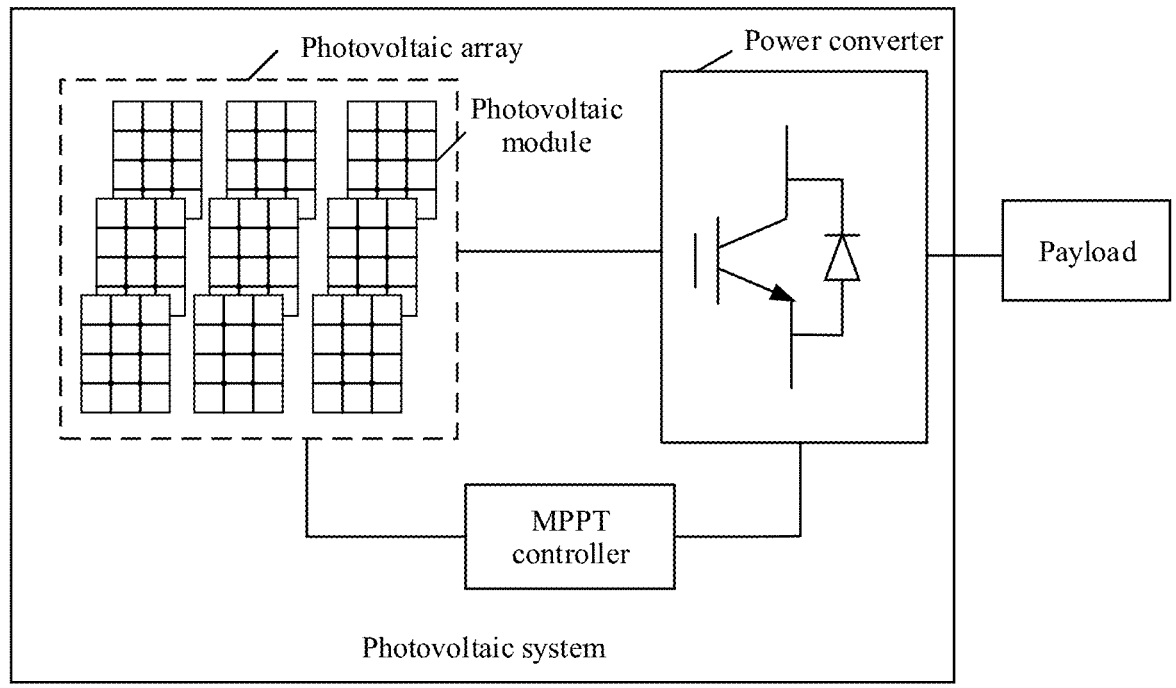
FIG. 2 is a schematic diagram of a structure of a photovoltaic system according to this application.

FIG. 2 is a schematic diagram of a structure of a photovoltaic system according to this application. In the photovoltaic system shown in FIG. 2, a photovoltaic array may be a photovoltaic module group. The photovoltaic module group may include one or more photovoltaic strings connected in parallel, and the photovoltaic string may be obtained after one or more photovoltaic modules are connected in series. The photovoltaic module herein may be a solar panel, a photovoltaic panel, or the like. In other words, in the photovoltaic system shown in FIG. 2, the photovoltaic string may be a photovoltaic string obtained after one or more solar panels, photovoltaic panels, or energy storage batteries are connected in series. Optionally, the photovoltaic system provided in this application may not include the photovoltaic array. In other words, in the photovoltaic system shown in FIG. 2, the photovoltaic array may be connected when required in an actual application scenario. For ease of description, description is provided below by using the photovoltaic system shown in FIG. 2 as an example. Details are not described below. In the photovoltaic system shown in FIG. 2, output currents of a plurality of photovoltaic strings may provide a direct current input voltage for a power converter, and after power conversion is performed for the voltage by using the power converter, power is supplied to a load such as a storage battery, a communications base station, or a household device in an alternating current grid. It may be understood that the photovoltaic system directly converts solar energy into electric energy by using the photovoltaic array manufactured by using a principle of the photoelectric effect, and a solar cell (or a photovoltaic panel) may convert solar light energy into direct current electric energy by using the photovoltaic effect. However, a current that can be generated by a single photovoltaic module (for example, a single solar cell or a single photovoltaic panel) is usually not enough for use by a common base station device or residential use. Therefore, a plurality of photovoltaic modules are connected in series or in parallel to form an array. For example, in the photovoltaic system, a single photovoltaic cell (namely, a single solar cell) is a minimum unit used for photoelectric conversion, a voltage generated by the single photovoltaic cell is approximately 0.45 V, and an operating current is approximately 20-25 mA/cm2. After single photovoltaic cells are packaged in series or in parallel, a photovoltaic cell array module (or referred to as a photovoltaic array module, or a photovoltaic array for short) is formed. After the photovoltaic cell array module is connected to an alternating current grid or an alternating current load by using the power converter such as a photovoltaic inverter, a direct current output by the photovoltaic array is converted into an alternating current by using the power converter such as the photovoltaic inverter for use by the alternating current grid or the alternating current load.

In the photovoltaic system shown in FIG. 2, an MPPT controller may be configured to be connected to the photovoltaic array, may detect a power generation voltage of the photovoltaic array in real time, and track a maximum voltage/current value (VI), so that the photovoltaic system supplies power to a storage battery, the alternating current grid, and/or the alternating current load at maximum power output. The MPPT controller may coordinate work of the solar cell (or the photovoltaic panel) in the photovoltaic array, the power converter, the storage battery, and/or the alternating current grid. In an actual process of using the photovoltaic system, the photovoltaic array is usually affected by a surrounding environment (dark clouds in the sky, a tree, a high-rise building, and dust), and consequently there is uneven light intensity for the photovoltaic array, resulting in a partial shading problem. When the photovoltaic array is partially shaded, a power-voltage characteristic curve (which may be referred to as a P-U curve for ease of description) output by the photovoltaic array exhibits a plurality of peak characteristics. In this case, how to quickly track a global MPP of the photovoltaic array and output a working point of the global MPP to the power converter to enable the photovoltaic system to work at the global MPP is a key factor to ensure an energy yield in the photovoltaic system. In the photovoltaic system shown in FIG. 2, the MPPT controller may obtain a multi-peak search start moment of global MPPT of the photovoltaic array based on the global MPPT of the photovoltaic array when there is a periodic shade for the photovoltaic array, and when the multi-peak search start moment arrives, start the global MPPT of the photovoltaic array to track the global MPP of the photovoltaic array. The MPPT controller may further output the working point of the global MPP to the power converter when tracking the global MPP of the photovoltaic array, so that the power converter works at the global MPP, and the photovoltaic system works at the global MPP. In this way, efficiency of obtaining the multi-peak search start moment of the global MPPT of the photovoltaic array may be improved, and precision of controlling the global MPPT of the photovoltaic array may be improved, to ensure the energy yield in the photovoltaic system. Operation of the photovoltaic system is simple and the system has high applicability.

Figure 3:
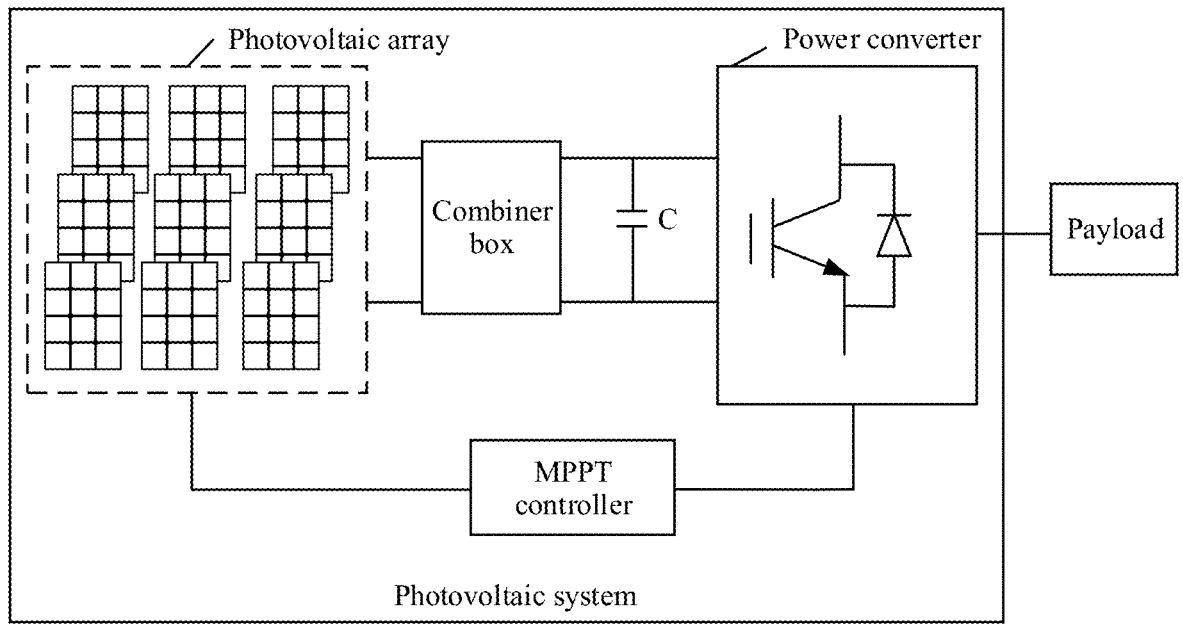
FIG. 3 is another schematic diagram of a structure of a photovoltaic system according to this application.

FIG. 3 is another schematic diagram of a structure of a photovoltaic system according to this application. The photovoltaic system shown in FIG. 3 may further include a direct current bus, and a photovoltaic array may be connected to a load by using the direct current bus and a power converter. Herein, the direct current bus may include one bus capacitor or a plurality of bus capacitors that are connected in series to each other and that may be configured to store energy. For example, as shown in FIG. 3, the direct current bus includes a bus capacitor C. In the photovoltaic system shown in FIG. 3, the power converter may convert a direct current that is output by the photovoltaic array and that is stored at two ends of the bus capacitor C into a direct current at a corresponding power or an alternating current for use by a direct current load or an alternating current load. Optionally, in some feasible implementations, as shown in FIG. 3, the photovoltaic system may further include a combiner box, and a plurality of photovoltaic strings in the photovoltaic array may be connected in parallel to the combiner box and connected to the direct current bus and/or the power converter by using the combiner box. It may be understood that the plurality of photovoltaic strings in the photovoltaic array may be connected in parallel to the combiner box and then directly connected to the power converter by using the combiner box, or may be connected to the direct current bus by using the combiner box and connected to the power converter by using the direct current bus. This may be specifically set based on an actual application scenario. This is not limited herein.

Figure 4:
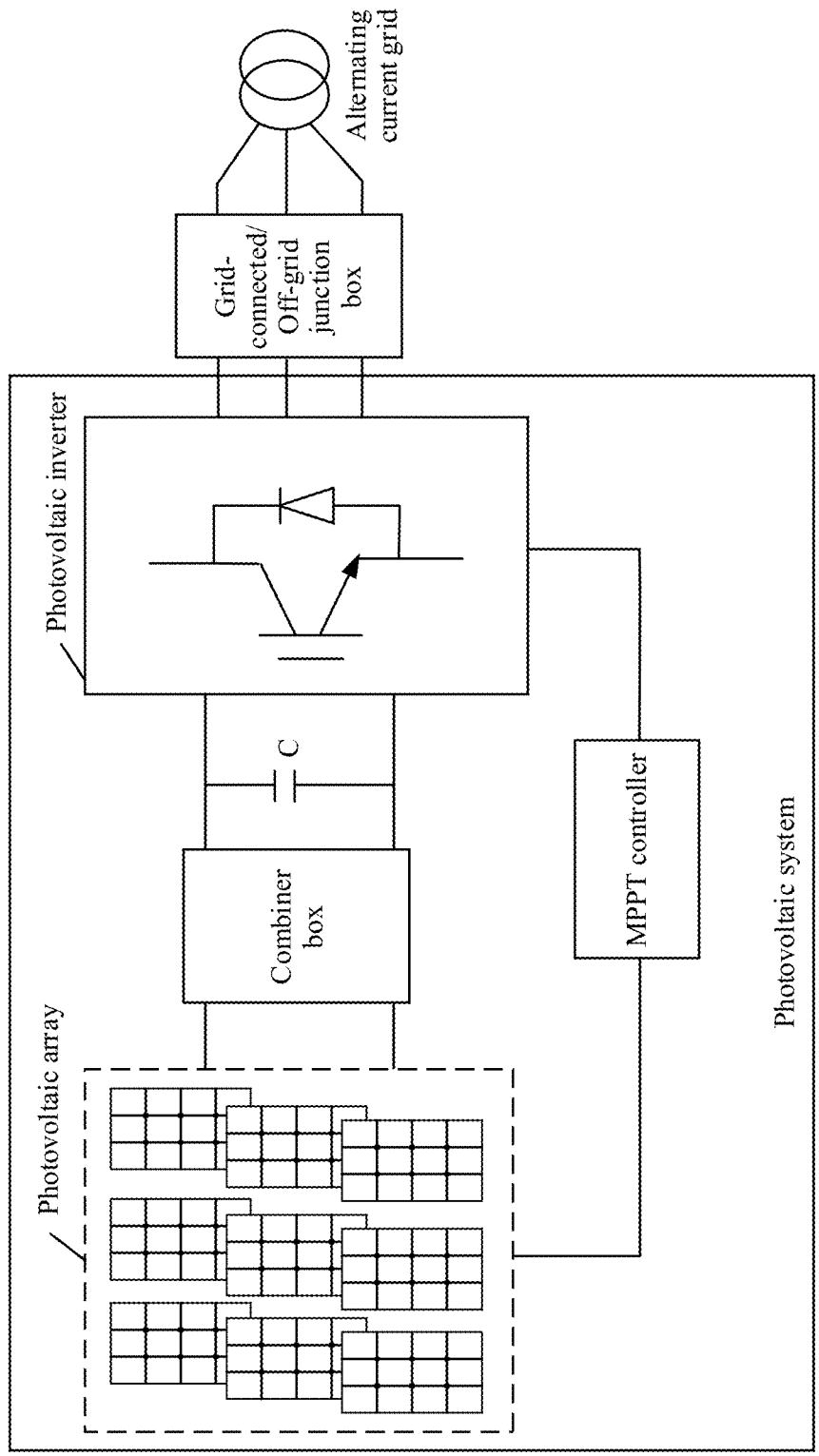
FIG. 4 is another schematic diagram of a structure of a photovoltaic system according to this application.

FIG. 4 is another schematic diagram of a structure of a photovoltaic system according to this application. In the photovoltaic system shown in FIG. 4, a power converter may be a photovoltaic inverter, a photovoltaic array may be connected to a direct current bus by using a combiner box and connected to the photovoltaic inverter by using the direct current bus, and the photovoltaic inverter is connected to an alternating current grid. In other words, output currents of a plurality of photovoltaic strings in the photovoltaic array may be combined by using the combiner box (in other words, the plurality of photovoltaic strings are connected in parallel to the combiner box), and then provide a direct current input voltage for the photovoltaic inverter. The photovoltaic inverter may convert a direct current that is output by the photovoltaic array and that is stored at two ends of a bus capacitor C into an alternating current, and output the alternating current to a household device or a communications base station in the alternating current grid for use. An MPPT controller is connected to the photovoltaic array and the photovoltaic inverter, and the MPPT controller may track a global MPP of the photovoltaic array, and output a working point of the global MPP to the photovoltaic inverter, so that the photovoltaic inverter works at the global MPP, and the photovoltaic system works at the global MPP, to ensure an energy yield in the photovoltaic system. Optionally, in some feasible implementations, as shown in FIG. 4, a load in the photovoltaic system may alternatively include a grid-connected/off-grid junction box, and the photovoltaic inverter may supply power to an alternating current load such as the communications base station or the household device in the alternating current grid by using the grid-connected/off-grid junction box.

Figure 5:
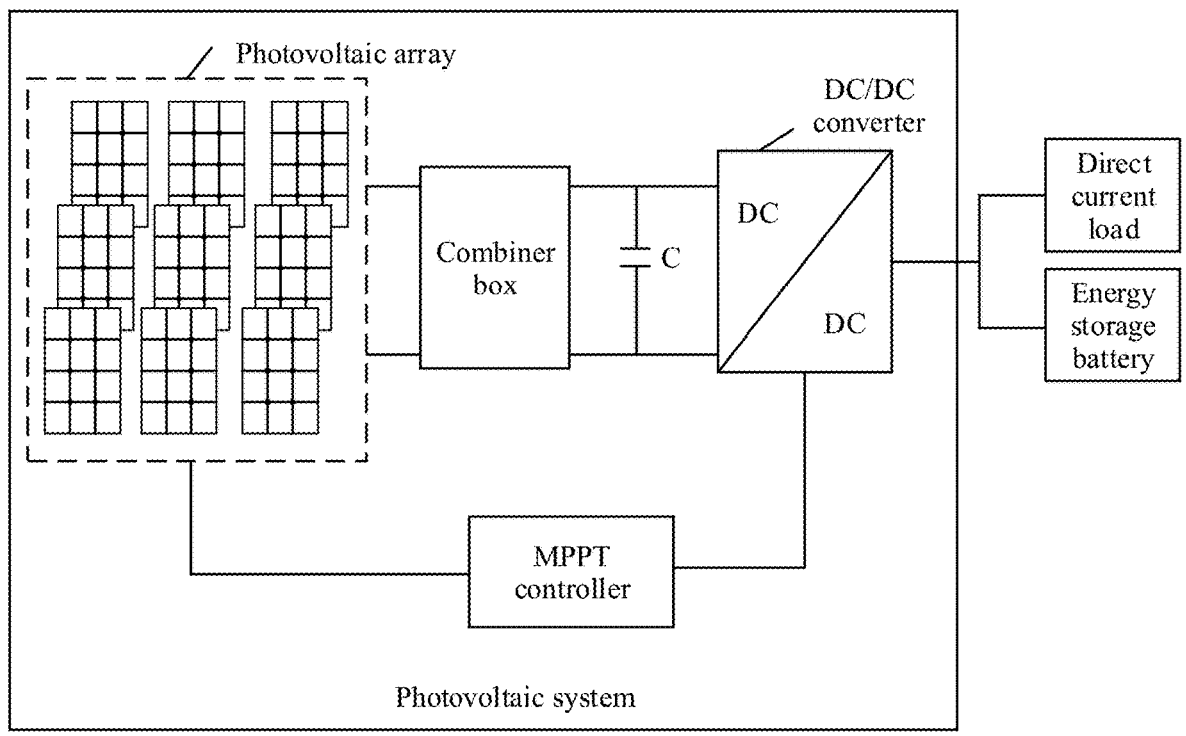
FIG. 5 is another schematic diagram of a structure of a photovoltaic system according to this application.
Figure 6:
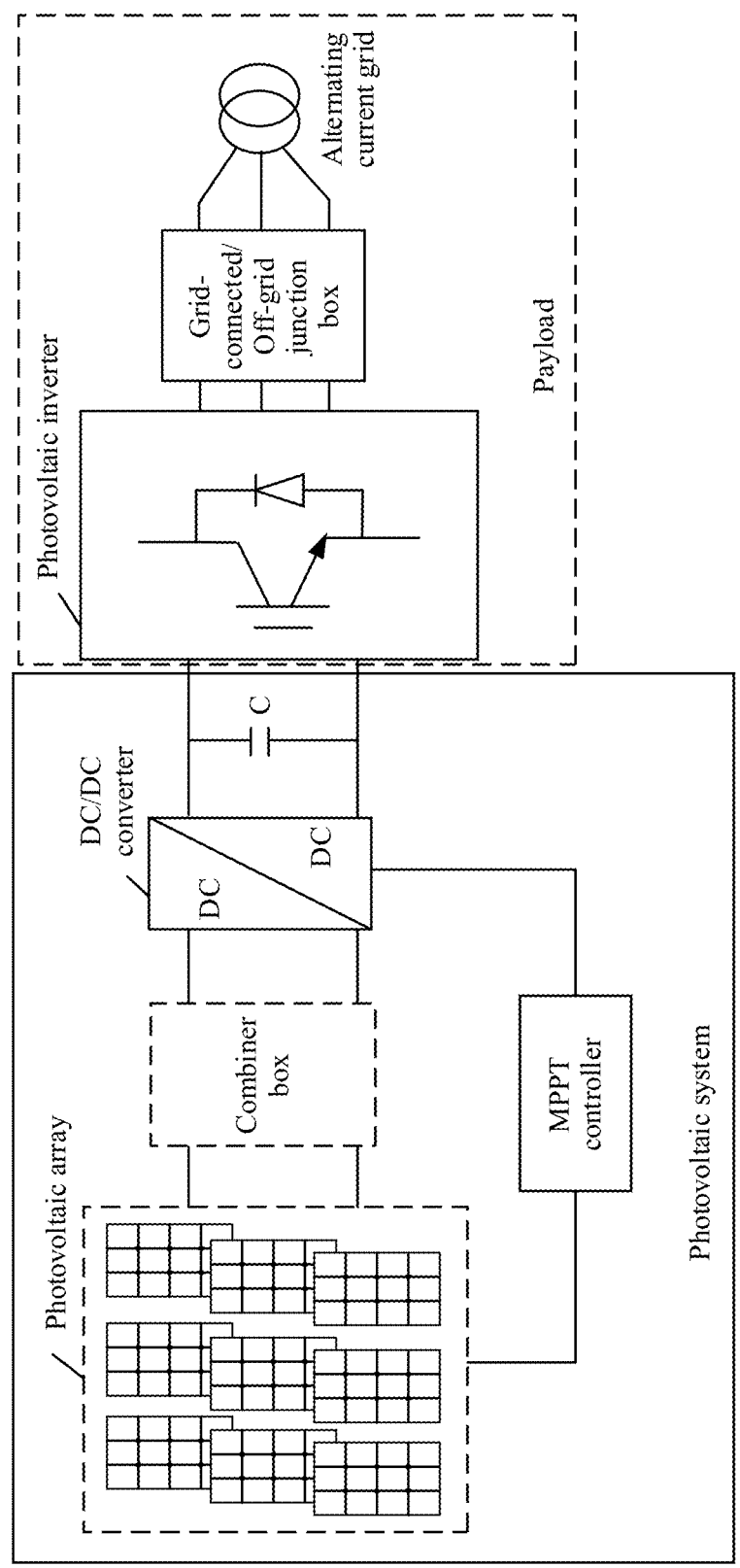
FIG. 6 is another schematic diagram of a structure of a photovoltaic system according to this application.

FIG. 5 is another schematic diagram of a structure of a photovoltaic system according to this application. In the photovoltaic system shown in FIG. 5, a power converter may be a direct current (DC)/DC converter, and a photovoltaic array may be connected to a direct current bus by using a combiner box and connected to the DC/DC converter by using the direct current bus. The DC/DC converter may convert a direct current that is output by the photovoltaic array and that is stored in the direct current bus into a direct current at a corresponding power for use by a direct current load such as a storage battery (or referred to as an energy storage battery). An MPPT controller is connected to the photovoltaic array and the DC/DC converter, and the MPPT may track a global MPP of the photovoltaic array, and output a working point of the global MPP to the DC/DC converter, so that the DC/DC converter works at the global MPP, and the photovoltaic system works at the global MPP, to ensure an energy yield in the photovoltaic system. Optionally, in some feasible implementations, the photovoltaic array may alternatively be connected to the direct current bus by using the DC/DC converter and connected to a load by using the direct current bus. In this case, the load may be a photovoltaic inverter or an energy storage battery. FIG. 6 is another schematic diagram of a structure of a photovoltaic system according to this application. In the photovoltaic system shown in FIG. 6, a power converter may be a DC/DC converter, and a photovoltaic array may be connected to a direct current bus by using the DC/DC converter and connected to a load by using the direct current bus. In this case, the load may include a photovoltaic inverter. The photovoltaic inverter is connected to an alternating current grid or an alternating current load. Optionally, the photovoltaic array may be further connected to the DC/DC converter by using a combiner box. In this case, the DC/DC converter may perform processing such as rectification or boost on a direct current output by the photovoltaic array, to obtain a direct current that can meet a requirement of the photovoltaic inverter for an input voltage, and store the direct current in the direct current bus capacitor. The photovoltaic inverter may convert a direct current voltage at two ends of the direct current bus into an alternating current required by the alternating current grid or the alternating current load, to supply power to the alternating current grid or the alternating current load. In this case, an MPPT controller is connected to the photovoltaic array and the DC/DC converter, and may track a global MPP of the photovoltaic array, and output a working point of the global MPP to the DC/DC converter, so that the DC/DC converter works at the global MPP, and the photovoltaic system works at the global MPP, to ensure an energy yield in the photovoltaic system.

Figure 7:
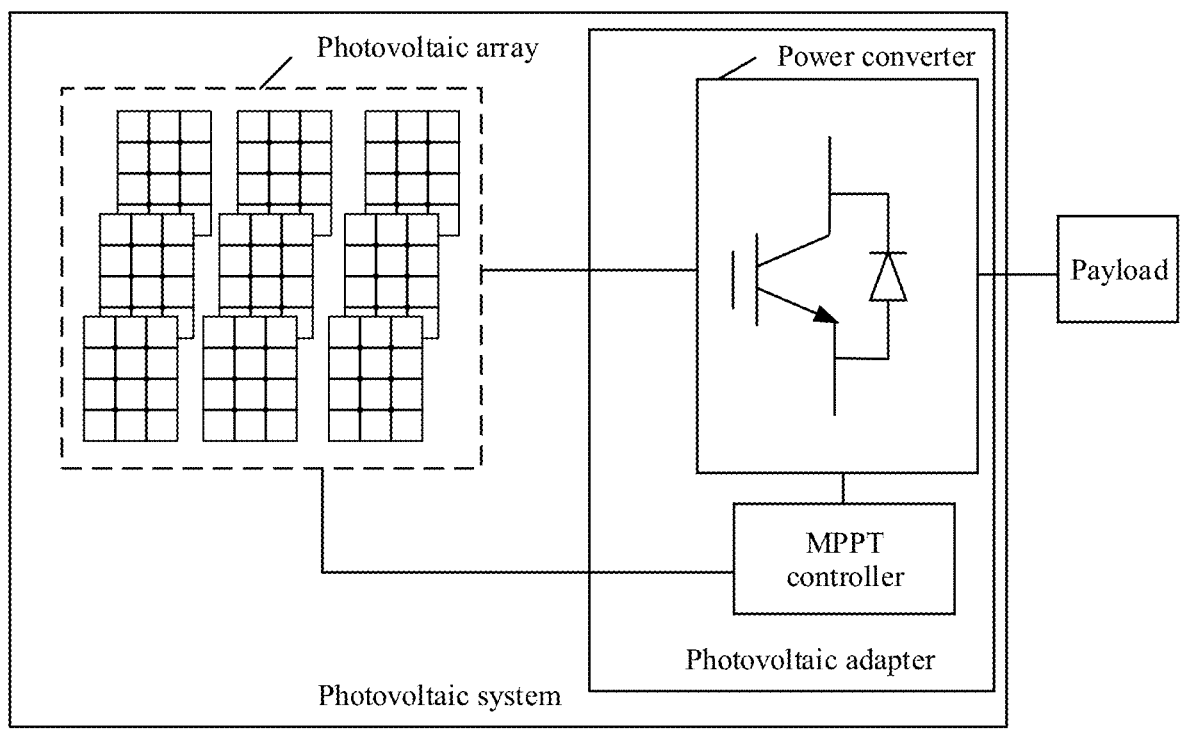
FIG. 7 is another schematic diagram of a structure of a photovoltaic system according to this application.

FIG. 7 is another schematic diagram of a structure of a photovoltaic system according to this application. As shown in FIG. 7, the photovoltaic system may include a photovoltaic adapter, and a photovoltaic array is connected to a load by using the photovoltaic adapter. The photovoltaic adapter may adjust an output voltage and/or an output current of the photovoltaic adapter to a target voltage or a target current based on a voltage and/or a current output by the photovoltaic array and a requirement of the load for an input voltage and/or an input current, and supply power to the load based on the target voltage or the target current. In the photovoltaic system shown in FIG. 7, the photovoltaic adapter may convert the output voltage of the photovoltaic array into the target voltage (for example, −48 V), and has an MPPT function. Herein, the photovoltaic adapter may be a photovoltaic MPPT controller. The photovoltaic MPPT controller may track and control changes in the output voltage and the output current caused by a change in a surface temperature and a change in solar irradiance of the photovoltaic array, so that a photovoltaic module always maintains a working state of maximum power output. In other words, the photovoltaic adapter may detect a power generation voltage of the photovoltaic array in real time, and track a maximum output current and output voltage of the photovoltaic array, so that the photovoltaic system supplies power to an electric device at maximum power output, to improve power supply efficiency of the system. In the photovoltaic system shown in FIG. 7, the MPPT controller and a power converter may be integrated into the photovoltaic adapter. In other words, the MPPT controller and the power converter may be functional modules in the photovoltaic adapter. The photovoltaic adapter may track a global MPP of the photovoltaic array by using the MPPT controller, and output a working point of the global MPP to the power converter, to output maximum power to the load. Optionally, in the photovoltaic system shown in FIG. 7, the photovoltaic adapter may be a DC/DC converter, a photovoltaic inverter, or a photovoltaic optimizer. This may be specifically determined based on an actual application scenario. This is not limited herein. In other words, the photovoltaic adapter shown in FIG. 7 may be a DC/DC converter or a photovoltaic inverter, and is applicable to any one of the photovoltaic systems shown in FIG. 2 to FIG. 6. When the photovoltaic adapter is a DC/DC converter or a photovoltaic inverter and is applicable to each of the photovoltaic systems shown in FIG. 2 to FIG. 6, the MPPT controller in each of the photovoltaic systems shown in FIG. 2 to FIG. 6 may be a functional module in the DC/DC converter or the photovoltaic inverter, and the power converter shown in FIG. 2 to FIG. 6 may be a rectifier/boost unit in the DC/DC converter, an inverter unit in the photovoltaic inverter, or the like. This may be specifically determined based on an actual application scenario. This is not limited herein.

In this application, in any one of the photovoltaic systems shown in FIG. 2 to FIG. 7, the MPPT controller may track the global MPP of the photovoltaic array in a working process of the photovoltaic system; the MPPT controller may obtain, when there is a periodic shade for the photovoltaic array, a multi-peak search start moment of the global MPPT of the photovoltaic array based on a status of tracking the global MPPT of the photovoltaic array, and when the multi-peak search start moment in each MPPT period arrives, start global MPPT of the photovoltaic array to track the global MPP of the photovoltaic array; and the MPPT controller may further output the working point of the global MPP to the power converter when tracking the global MPP of the photovoltaic array, so that the photovoltaic system works at the global MPP. In this way, efficiency of obtaining the multi-peak search start moment of the global MPPT of the photovoltaic array may be improved, and precision of controlling the global MPPT of the photovoltaic array may be improved, to ensure an energy yield in the photovoltaic system. Operation of the photovoltaic system is simple and the system has high applicability.

For ease of description, function implementation of the MPPT controller and the MPPT control method for a photovoltaic system provided in the embodiments of this application are described below by using the structure of the photovoltaic system shown in FIG. 2 as an example.

In some feasible implementations, in a working process of the photovoltaic system, the MPPT controller may monitor, in real time, a P-U curve output by a photovoltaic array, to track a global MPP of the photovoltaic array in real time. It may be understood that if the photovoltaic array is not affected by a factor such as an external shade, and outputs a P-U curve in a single-peak form, the MPPT controller may track a peak characteristic of the P-U curve in the single-peak form, to obtain the global MPP of the photovoltaic array. If the photovoltaic array is affected by a factor such as an external shade, and outputs a P-U curve in a multi-peak form, the MPPT controller may track the global MPP of the photovoltaic array based on a plurality of multi-peak MPPT algorithms, to obtain the global MPP of the photovoltaic array. Herein, the MPPT controller may implement global MPPT of the photovoltaic array based on a plurality of conventional multi-peak search methods (namely, multi-peak MPPT algorithms, or referred to as multi-peak recognition algorithms, and for ease of description, description is provided below by using the multi-peak recognition algorithms as an example) such as a two-step method, an improved global scanning method, a power closed-loop scanning-based tracking method, and a particle swarm-based tracking method. It may be understood that herein, the multi-peak MPPT algorithms such as the two-step method, the improved global scanning method, the power closed-loop scanning-based tracking method, and the particle swarm-based tracking method are merely examples. In this application, the MPPT controller may implement the global MPPT of the photovoltaic array based on any multi-peak MPPT algorithm. This may be specifically determined based on an actual application scenario. This is not limited herein. It may be understood that in a process of tracking, by the MPPT controller, the global MPP in the P-U curve in the multi-peak form, in addition to selecting a more efficient global MPPT algorithm, more efficient tracking of the global MPP of the photovoltaic array further depends on selection of a multi-peak search start moment of the global MPPT of the photovoltaic array. The MPPT controller may obtain, when there is a periodic shade for the photovoltaic array, the multi-peak search start moment of the global MPPT of the photovoltaic array based on a status of tracking the global MPP of the photovoltaic array, and then when the multi-peak search start moment arrives, start the global MPPT of the photovoltaic array to more efficiently track the global MPP of the photovoltaic array, to ensure an energy yield in the photovoltaic system.

In some feasible implementations, in an application scenario in which there is a periodic shade for the photovoltaic array, a plurality of peaks usually appear, at a periodic moment, in a P-U curve output by the photovoltaic array. For example, a plurality of peaks repeatedly appear at about a specific moment every day. Therefore, by periodically recognizing a plurality of peaks for the P-U curve output by the photovoltaic array, it may be determined whether there is a periodic shade for the photovoltaic array, to predict a future moment at which a plurality of peaks appear, so that when the moment arrives, the global MPPT of the photovoltaic array is started, to improve efficiency of the global MPPT of the photovoltaic array. The MPPT controller may first track the global MPP of the photovoltaic array based on a plurality of preset MPPT periods. Herein, the MPPT period may be one day (for example, 24 hours that last from 0:00 to 24:00 every day). In the working process of the photovoltaic system, the MPPT controller runs a multi-peak recognition algorithm in a current MPPT period (which may be referred to as a first MPPT period for ease of description), and waits for the multi-peak search to start. Herein, in the first MPPT period, the multi-peak search start moment (which may be referred to as a first multi-peak search start moment for ease of description) of the global MPPT of the photovoltaic array may be a multi-peak search start moment set based on experience or experimental data, and may be specifically determined based on an actual application scenario. This is not limited herein. For example, the first multi-peak search start moment may be a multi-peak search start moment obtained based on a multi-peak search start method such as a method for starting multi-peak search based on a fixed time or a method for starting multi-peak search in the case of an imbalance in a string circuit. This may be specifically determined based on an actual application scenario. This is not limited herein. In other words, the first multi-peak search start moment may be a pre-agreed fixed moment in the MPPT period, or may be a moment, in the first MPPT period, that is obtained based on an algorithm such as an algorithm of starting multi-peak search in the case of an imbalance in the string circuit, and may be specifically determined based on an actual application scenario. This is not limited herein. The MPPT controller may start the global MPPT of the photovoltaic array when the first multi-peak search start moment arrives, to track the global MPP of the photovoltaic array.

In some feasible implementations, if the MPPT controller tracks the global MPPT (which may be referred to as a first global MPP for ease of description) of the photovoltaic array in the first MPPT period, the MPPT controller may record and store the first multi-peak search start moment (the first multi-peak search start moment may be recorded as T0 for ease of description) when tracking the first global MPP. If tracking no global MPPT of the photovoltaic array in the first MPPT period, the MPPT controller may set a next period of the first MPPT period as a new first MPPT period when the next period arrives, and when the first multi-peak search start moment in the new first MPPT period arrives, start the global MPPT of the photovoltaic array to track the global MPP of the photovoltaic array. If tracking the first global MPP, the MPPT controller records and stores the first multi-peak search start moment in the new first MPPT period as T0. In addition, when there is a periodic shade for the photovoltaic array, a plurality of peaks usually appear, at a periodic moment, in the P-U curve output by the photovoltaic array. Therefore, after tracking the first global MPP, the MPPT controller may determine whether the global MPP of the photovoltaic array can be tracked at about the moment T0 in N MPPT periods (for ease of description, description may be provided by using N second MPPT periods as an example) before the first MPPT period, to obtain information indicating whether there is a periodic shade for the photovoltaic array, where N is a natural number greater than 1.

In some feasible implementations, when tracking the first global MPP of the photovoltaic array in the first MPPT period, the MPPT controller may obtain, based on a duration Tw before T0 and a duration Tw after T0, a multi-peak search time period used to determine that there is a periodic shade. In other words, the MPPT controller may obtain, based on T0, the multi-peak search time period (namely, a multi-peak search time period for a periodic shade) used to determine whether there is a periodic shade for the photovoltaic array. For ease of description, the multi-peak search moment for a periodic shade may be recorded as T0±Tw. The MPPT controller may search historical data of tracking the global MPPT of the photovoltaic array for a status of tracking the global MPP of the photovoltaic array in the time period T0±Tw in each second MPPT period, to obtain information indicating whether there is a periodic shade for the photovoltaic array. In this application, the MPPT controller may obtain a duration 2Tw (namely, 30 minutes), namely, a sum of a duration Tw (for example, Tw is 15 minutes) and a duration Tw respectively before and after the first multi-peak search start moment, and use the duration 2Tw as the multi-peak search time period for a periodic shade. In this way, a probability of tracking the global MPP in the multi-peak search time period may be increased, and tracking effectiveness of tracking the global MPP based on multi-peak search may be improved. Operation of the photovoltaic system is simple and the system has high applicability. Further, the MPPT controller may record a quantity of second MPPT periods (the quantity of second MPPT periods may be recorded as E for ease of description) that include the time period T0±Tw in which the global MPP of the photovoltaic array is tracked, and if E is greater than or equal to M, may obtain information indicating that there is a periodic shade for the photovoltaic array. Herein, M is a natural number less than N. Herein, a value of each of N, Tw, and M may be determined based on an actual application scenario. This is not limited herein. In some feasible implementations, a value of N may be 5, a value of M may be 3, a value of Tw may be 15 minutes, and the MPPT period may be one day. If detecting that multi-peak search is started in the time period T0±15 minutes in each of five second MPPT periods before the first MPPT period and the quantity E of second MPPT periods in which the global MPP of the photovoltaic array is found is greater than or equal to 3, the MPPT controller may consider that a plurality of peaks appear, at a periodic moment, in the P-U curve output by the photovoltaic array, and in this case, may determine that there is a periodic shade for the photovoltaic array. It may be understood that in the application scenario in which there is a periodic shade for the photovoltaic array, even if there is a same periodic shade for a same photovoltaic array, in different seasons or different multi-peak search time periods, there may be different quantities of second MPPT periods, in the N second MPPT periods, in which the global MPP of the photovoltaic array is tracked. Therefore, based on the setting of N and M, it may be implemented that setting of a proportion or a probability of tracking the global MPP of the photovoltaic array is closer to an actual application scenario. Operation of the photovoltaic system is simple and the system has high applicability.

In some feasible implementations, after obtaining, based on the status of tracking the global MPP of the photovoltaic array that is obtained after multi-peak search is triggered in the N MPPT periods before the first MPPT period, information indicating that there is a periodic shade for the photovoltaic array, the MPPT controller may further obtain an initial multi-peak search start moment (or referred to as an initial value of the multi-peak search start moment, and the multi-peak search start moment may be recorded as T for ease of description) of the global MPPT of the photovoltaic array based on E tracking moments, in the E second MPPT periods in the N second MPPT periods, at which the photovoltaic array is tracked, and then when the initial multi-peak search start moment in the next MPPT period of the first MPPT period arrives, may start the global MPPT of the photovoltaic array, and obtain the multi-peak search start moment of the global MPPT of the photovoltaic array based on a moment at which the global MPP of the photovoltaic array is tracked. Optionally, the MPPT controller may calculate a median (namely, a median moment, which may be recorded as Tm for ease of description) of all of the E tracking moments (namely, moments at which the global MPP of the photovoltaic array appears). The MPPT controller may obtain Tm, use Tm as the initial multi-peak search start moment (in other words, the initial value of T is Tm in this case) of the global MPPT of the photovoltaic array, and when the moment Tm in the next MPPT period of the first MPPT period arrives, start a multi-peak search of the photovoltaic array to start the global MPPT of the photovoltaic array. The MPPT controller may monitor whether the global MPP of the photovoltaic array is found after the multi-peak search of the photovoltaic array is started at the moment Tm, and if the global MPP of the photovoltaic array is tracked, may record the moment (namely, a moment at which the global MPP is generated in the P-U curve output by the photovoltaic array, which may be recorded as Tf for ease of description) at which the global MPPT of the photovoltaic array is tracked as the multi-peak search start moment (which may be recorded as T=Tf for ease of description) of the global MPPT of the photovoltaic array. Starting from a next period (for ease of description, description may be provided by using a target MPPT period as an example) of the next period (namely, a period in which the multi-peak search start moment is obtained) of the first MPPT period, the MPPT controller may start the global MPPT of the photovoltaic array when the multi-peak search start moment (T=Tf) in each MPPT period arrives, to find the global MPP of the photovoltaic array in a timely manner. When tracking the global MPP in each MPPT period, the MPPT controller may further output a working point of the global MPP in each MPPT period to a power converter, to ensure an energy yield in the photovoltaic system. Operation of the photovoltaic system is simple and the system has high applicability. In other words, when there is a periodic shade for the photovoltaic array, the MPPT controller obtains the initial multi-peak search start moment based on tracking moments at which a plurality of global MPPs are tracked when there is a periodic shade for the photovoltaic array, and then starts the global MPPT of the photovoltaic array in the next MPPT period based on the initial multi-peak search start moment, to further correct the multi-peak search start moment based on a result of the global MPPT of the photovoltaic array, so that the multi-peak search is started in a subsequent MPPT period based on a corrected multi-peak search start moment, to improve effectiveness of tracking the global MPP of the photovoltaic array and improve efficiency and accuracy of the global MPPT of the photovoltaic array.

Optionally, in some feasible implementations, when obtaining the initial multi-peak search start moment of the global MPPT of the photovoltaic array, the MPPT controller may further obtain a target moment (namely, a moment (Tm−Ts)) that is earlier than Tm by a duration Ts, and use the target moment as the initial multi-peak search start moment (in other words, the initial value of T is Tm−Ts in this case) of the global MPPT of the photovoltaic array. In other words, the MPPT controller may obtain the target moment (Tm−Ts) before Tm, and use the target moment as the initial multi-peak search start moment of the global MPPT of the photovoltaic array. Herein, a time length between the target moment and Tm is Ts. When the initial multi-peak search start moment (Tm−Ts) in the next MPPT period of the first MPPT period arrives, the MPPT controller may start a multi-peak search of the photovoltaic array to start the global MPPT of the photovoltaic array. When the moment (Tm−Ts) in the next MPPT period of the first MPPT period arrives, the MPPT controller may start a multi-peak search of the photovoltaic array to start the global MPPT of the photovoltaic array. The MPPT controller may monitor whether the global MPP of the photovoltaic array is found after the multi-peak search of the photovoltaic array is started at the moment Tm, and if the global MPP of the photovoltaic array is tracked, may record the moment (namely, the moment at which the global MPP is generated in the P-U curve output by the photovoltaic array) at which the global MPPT of the photovoltaic array is tracked as the multi-peak search start moment (which may be recorded as T=Tf for ease of description) of the global MPPT of the photovoltaic array. Starting from the target MPPT period, the MPPT controller may start the global MPPT of the photovoltaic array when the multi-peak search start moment (T=Tf) in each MPPT period arrives, to find the global MPP of the photovoltaic array in a timely manner. In this application, the MPPT controller may use the moment that is earlier than Tm by the duration Ts as the initial value of the initial multi-peak search start moment. Tm is a median of the E tracking moments, and therefore effectiveness and applicability of the initial multi-peak search start moment may be ensured, and a probability of tracking the global MPPT of the photovoltaic array may be increased, to ensure efficiency of tracking the global MPP of the photovoltaic array.

Optionally, in some feasible implementations, if tracking no global MPP of the photovoltaic array after multi-peak search of the photovoltaic array is started at the moment (Tm−Ts) in the next MPPT period of the first MPPT period, the MPPT controller may update the initial multi-peak search start moment T based on a preset start delay duration Tb (in this case, the initial value of T may be updated to T=T+Tb) until the global MPPT of the photovoltaic array is started at an updated initial multi-peak search start moment and the global MPP of the photovoltaic array is tracked, to find the moment Tf at which the global MPP of the photovoltaic array is tracked. Herein, the initial multi-peak search start moment T is updated based on the preset start delay duration Tb, so that it may be ensured that the initial multi-peak search start moment is closer to an actual multi-peak search start moment at which the global MPP of the photovoltaic array is tracked, to ensure accuracy of a finally obtained multi-peak search start moment. Herein, Tb may be a natural number less than Ts, and values of Tb and Ts may be determined based on an actual application scenario. This is not limited herein. For example, the value of Ts may be 20 minutes, and the value of Tb may be 1 minute. After obtaining Tf, the MPPT controller may start, starting from the next MPPT period (namely, the target MPPT period), the global MPPT of the photovoltaic array when the multi-peak search start moment Tf in each MPPT period arrives, to find the global MPP of the photovoltaic array in a timely manner. When tracking the global MPP in each MPPT period, the MPPT controller may further output the working point of the global MPP to the power converter, so that the power converter works at the global MPP in each MPPT period, to ensure the energy yield in the photovoltaic system. Operation of the photovoltaic system is simple and the system has high applicability.

In this application, the MPPT controller may obtain, when there is a periodic shade for the photovoltaic array, the multi-peak search start moment of the global MPPT of the photovoltaic array based on the status (including whether the global MPP is tracked in a plurality of consecutive MPPT periods, in other words, whether there are a plurality of periodic peaks in the P-U curve output by the photovoltaic array) of tracking the global MPP of the photovoltaic array in the plurality of MPPT periods. In the application scenario in which there is a periodic shade for the photovoltaic array, a plurality of peaks usually appear in the P-U curve of the photovoltaic array at a periodic moment. For example, a plurality of peaks repeatedly appear at about a specific moment every day. Therefore, the global MPPT of the photovoltaic array may be periodically tracked to determine whether there is a periodic shade, to predict a future moment at which a plurality of peaks appear, and multi-peak search of the photovoltaic array is started at the predicted moment. In this way, efficiency of the global MPPT of the photovoltaic array may be improved. The MPPT controller may be configured to: starting from the target MPPT period after the plurality of MPPT periods, start the global MPPT of the photovoltaic array when the multi-peak search start moment in each MPPT period arrives, and output the working point of the global MPP to the power converter when tracking the global MPP in each MPPT period, so that the power conversion module works at the global MPP in each MPPT period. In this way, efficiency of obtaining the multi-peak search start moment of the global MPPT of the photovoltaic array may be improved, and therefore precision of controlling the global MPPT of the photovoltaic array may be improved, to ensure the energy yield in the photovoltaic system. Operation of the photovoltaic system is simple and the system has high applicability.

Figure 8:
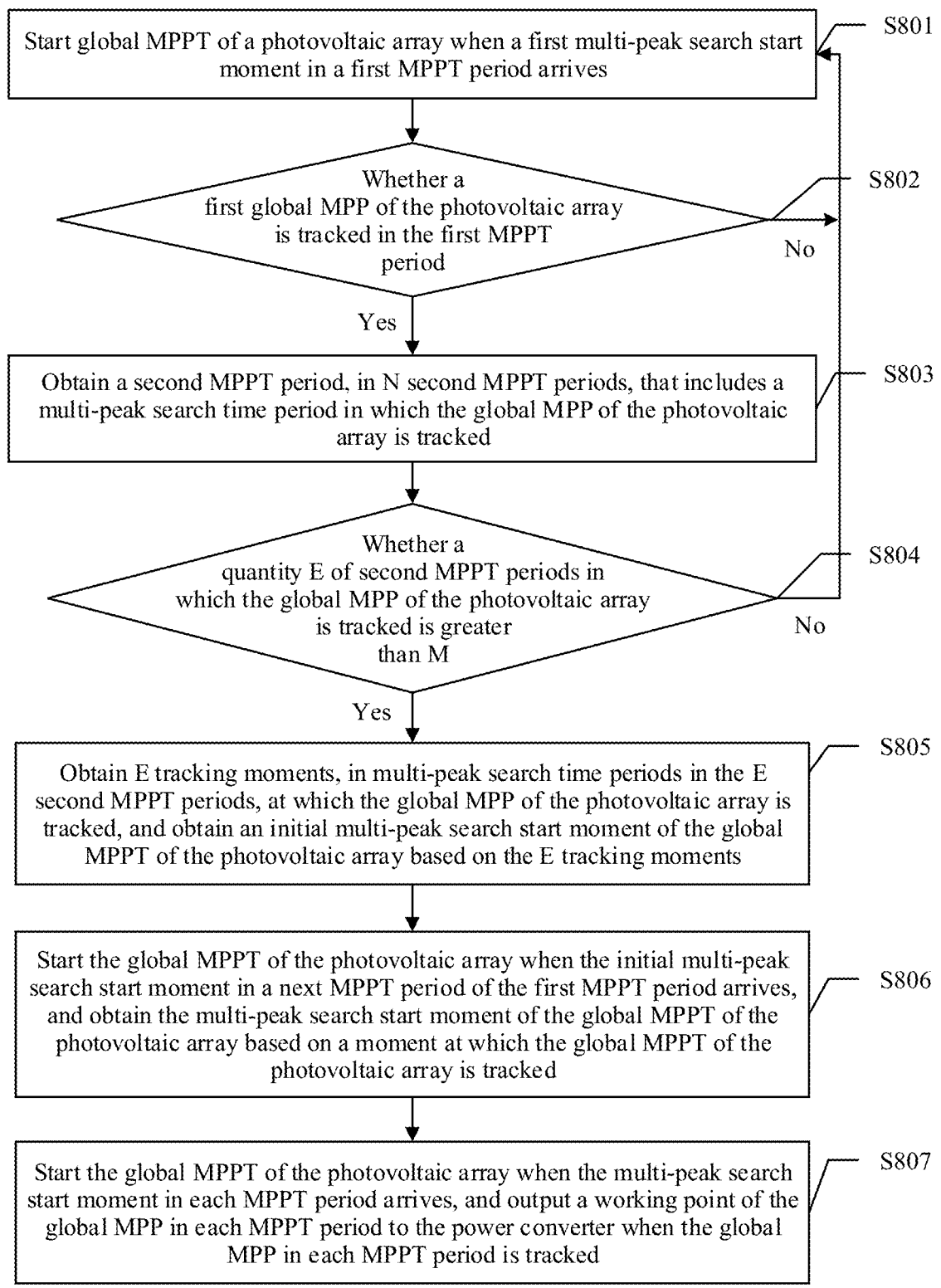
FIG. 8 is a schematic flowchart of an MPPT control method for a photovoltaic system according to this application.

FIG. 8 is a schematic flowchart of an MPPT control method for a photovoltaic system according to this application. The MPPT control method for a photovoltaic system provided in this application is applicable to an MPPT controller in any one of the photovoltaic systems shown in FIG. 1 to FIG. 7. The MPPT controller is connected to a power converter in the photovoltaic system, and may be configured to be connected to a photovoltaic array. The photovoltaic array is connected to a load by using the power converter. As shown in FIG. 8, the MPPT control method for a photovoltaic system provided in this application includes the following steps.

S801. Start global MPPT of the photovoltaic array when a first multi-peak search start moment in a first MPPT period arrives.

S802. Determine whether a first global MPP of the photovoltaic array is tracked in the first MPPT period. If a determining result is yes, step S803 is performed. If a determining result is no, step S801 is performed.

In some feasible implementations, in an application scenario in which there is a periodic shade for the photovoltaic array, a plurality of peaks usually appear, at a periodic moment, in a P-U curve output by the photovoltaic array. For example, a plurality of peaks repeatedly appear at about a specific moment every day. Therefore, by periodically recognizing a plurality of peaks for the P-U curve output by the photovoltaic array, it may be determined whether there is a periodic shade for the photovoltaic array, to predict a future moment at which a plurality of peaks appear, so that when the moment arrives, the global MPPT of the photovoltaic array is started, to improve efficiency of the global MPPT of the photovoltaic array. The MPPT controller may first track the global MPP of the photovoltaic array based on a plurality of preset MPPT periods, to obtain a multi-peak search start moment of the global MPPT of the photovoltaic array when there is a periodic shade for the photovoltaic array. Herein, the MPPT period may be one day (for example, 24 hours that last from 0:00 to 24:00 every day). In a working process of the photovoltaic system, the MPPT controller runs a multi-peak recognition algorithm in a current MPPT period (which may be referred to as the first MPPT period for ease of description), and waits for the multi-peak search to start. Herein, in the first MPPT period, the multi-peak search start moment of the global MPPT of the photovoltaic array may be a multi-peak search start moment (which may be referred to as the first multi-peak search start moment for ease of description) obtained based on a multi-peak search start method such as a method for starting multi-peak search based on a fixed time or a method for starting multi-peak search in the case of an imbalance in a string circuit, and may be specifically determined based on an actual application scenario. This is not limited herein. In other words, the first multi-peak search start moment may be a pre-agreed fixed moment in the MPPT period, or may be a moment obtained based on an algorithm such as an algorithm of starting multi-peak search in the case of an imbalance in the string circuit, and may be specifically obtained based on an actual application scenario. This is not limited herein. The MPPT controller may start the global MPPT of the photovoltaic array when the first multi-peak search start moment arrives, to track the global MPP of the photovoltaic array.

In some feasible implementations, in the first MPPT period, after starting the global MPPT of the photovoltaic array when the first multi-peak search start moment in the first MPPT period arrives, the MPPT controller may collect, in real time, data output by the photovoltaic array, and track a peak characteristic of the P-U curve output by the photovoltaic array, to track the global MPP of the photovoltaic array. If the MPPT controller tracks the global MPPT (namely, the first global MPP) of the photovoltaic array in the first MPPT period, the MPPT controller may record and store the first multi-peak search start moment (the first multi-peak search start moment may be recorded as T0 for ease of description). If tracking no global MPPT of the photovoltaic array in the first MPPT period, the MPPT controller may set a next period of the first MPPT period as a new first MPPT period when the next period arrives, and when the first multi-peak search start moment in the new first MPPT period arrives, start the global MPPT of the photovoltaic array to track the global MPP of the photovoltaic array. The MPPT controller may track, in real time, the peak characteristic of the P-U curve output by the photovoltaic array, to obtain information indicating whether the global MPP of the photovoltaic array is tracked. If tracking the first global MPP, the MPPT controller records and stores the first multi-peak search start moment in the new first MPPT period as T0. If tracking no global MPP of the photovoltaic array in the current MPPT period, the MPPT controller may use the next MPPT period of the first MPPT period as the first MPPT period, and perform step S801 again.

S803. Obtain a second MPPT period, in N second MPPT periods, that includes a multi-peak search time period in which the global MPP of the photovoltaic array is tracked.

S804. Determine whether a quantity E of second MPPT periods in which the global MPP of the photovoltaic array is tracked is greater than M. If a determining result is yes, step S805 is performed. If a determining result is no, step S801 is performed.

In some feasible implementations, when there is a periodic shade for the photovoltaic array, a plurality of peaks usually appear, at a periodic moment, in the P-U curve output by the photovoltaic array. Therefore, after tracking the first global MPP, the MPPT controller may determine whether the global MPP of the photovoltaic array can be tracked at about the moment T0 in N MPPT periods (for ease of description, description may be provided by using the N second MPPT periods as an example) before the first MPPT period, to obtain information indicating whether there is a periodic shade for the photovoltaic array, where N is a natural number greater than 1.

In some feasible implementations, when tracking the first global MPP of the photovoltaic array in the first MPPT period, the MPPT controller may obtain a duration Tw before T0 and a duration Tw after T0, and use a sum of the durations as the multi-peak search time period used to determine that there is a periodic shade. In other words, the MPPT controller may obtain, based on T0, the multi-peak search time period (namely, a multi-peak search time period for a periodic shade) used to determine whether there is a periodic shade for the photovoltaic array. For ease of description, the multi-peak search moment for a periodic shade may be recorded as T0±Tw. The MPPT controller may search historical data of tracking the global MPPT of the photovoltaic array for a status of tracking the global MPP of the photovoltaic array in the time period T0±Tw in each second MPPT period, to obtain information indicating whether there is a periodic shade for the photovoltaic array. In this application, the MPPT controller may obtain a duration 2Tw (namely, 30 minutes), namely, the sum of the duration Tw (for example, Tw is 15 minutes) and the duration Tw respectively before and after the first multi-peak search start moment, and use the duration 2Tw as the multi-peak search time period for a periodic shade. In this way, a probability of tracking the global MPP in the multi-peak search time period may be increased, and tracking effectiveness of tracking the global MPP based on multi-peak search may be improved. Operation of the photovoltaic system is simple and the system has high applicability. Further, the MPPT controller may record the quantity of second MPPT periods (the quantity of second MPPT periods may be recorded as E for ease of description) that include the time period T0±Tw in which the MPPT controller tracks the global MPP of the photovoltaic array, and if E is greater than or equal to M, may obtain the multi-peak search start moment of the global MPPT of the photovoltaic array, and use the multi-peak search start moment as the multi-peak search start moment that is of the global MPPT of the photovoltaic array and that is obtained when there is a periodic shade for the photovoltaic array. Herein, M is a natural number less than N. Herein, a value of each of N, Tw, and M may be determined based on an actual application scenario. This is not limited herein.

In some feasible implementations, a value of N may be 5, a value of M may be 3, a value of Tw may be 15 minutes, and the MPPT period may be one day. If detecting that a multi-peak search is started in the time period T0±15 minutes in each of five second MPPT periods before the first MPPT period and the quantity E of second MPPT periods in which the global MPP of the photovoltaic array is found is greater than or equal to 3, the MPPT controller may consider that a plurality of peaks appear, at a periodic moment, in the P-U curve output by the photovoltaic array, and in this case, may determine that there is a periodic shade for the photovoltaic array. In other words, in historical data of the global MPPT of the photovoltaic array in the five second MPPT periods before the first MPPT period, the MPPT controller starts a multi-peak search of the photovoltaic array in the time period T0±15 minutes in each of at least three second MPPT periods and finds the global MPP of the photovoltaic array. In this case, the multi-peak search start moment of the global MPPT of the photovoltaic array may be obtained, and used as the multi-peak search start moment that is of the global MPPT of the photovoltaic array and that is obtained when there is a periodic shade for the photovoltaic array. It may be understood that in the application scenario in which there is a periodic shade for the photovoltaic array, even if there is a same periodic shade for a same photovoltaic array, in different seasons or different multi-peak search time periods, there may be different quantities of second MPPT periods, in the N second MPPT periods, in which the global MPP of the photovoltaic array is tracked. Therefore, based on the setting of N and M, it may be implemented that setting of a proportion or a probability of tracking the global MPP of the photovoltaic array is closer to an actual application scenario. Operation of the photovoltaic system is simple and the system has high applicability. If detecting that multi-peak search is started in the time period T0±15 minutes in each of the five second MPPT periods before the first MPPT period and the quantity E of second MPPT periods in which the global MPP of the photovoltaic array is found is less than 3, in other words, the MPPT controller starts the multi-peak search of the photovoltaic array in the time period T0±15 minutes in each of second MPPT periods whose quantity is less than 3 and finds the global MPP of the photovoltaic array, the MPPT controller may consider that a plurality of peaks does not appear, at a periodic moment, in the P-U curve output by the photovoltaic array, and therefore may consider that there is no periodic shade for the photovoltaic array. In this case, when the next MPPT period of the first MPPT period arrives, the MPPT controller may use the period as a new first MPPT period, and perform step S901, to obtain, by tracking the global MPPT of the photovoltaic array in a next time period, information indicating whether there is a periodic shade for the photovoltaic array.

S805. Obtain E tracking moments, in the multi-peak search time periods in the E second MPPT periods, at which the global MPP of the photovoltaic array is tracked, and obtain an initial multi-peak search start moment of the global MPPT of the photovoltaic array based on the E tracking moments.

In some feasible implementations, after obtaining, based on the status of tracking the global MPP of the photovoltaic array that is obtained after the multi-peak search is triggered in the N MPPT periods before the first MPPT period, information indicating that there is a periodic shade for the photovoltaic array, the MPPT controller may further obtain the initial multi-peak search start moment (or referred to as an initial value of the multi-peak search start moment, and the multi-peak search start moment may be recorded as T for ease of description) of the global MPPT of the photovoltaic array based on the E tracking moments, in the E second MPPT periods in the N second MPPT periods, at which the photovoltaic array is tracked, and then when the initial multi-peak search start moment in the next MPPT period of the first MPPT period arrives, may start the global MPPT of the photovoltaic array, and obtain the multi-peak search start moment of the global MPPT of the photovoltaic array based on a moment at which the global MPP of the photovoltaic array is tracked. Optionally, the MPPT controller may calculate a median (namely, a median moment, which may be recorded as Tm for ease of description) of all of the E tracking moments (namely, moments at which the global MPP of the photovoltaic array appears). The MPPT controller may obtain Tm, use Tm as the initial multi-peak search start moment (in other words, the initial value of T is Tm in this case) of the global MPPT of the photovoltaic array, and when the moment Tm in the next MPPT period of the first MPPT period arrives, start a multi-peak search of the photovoltaic array to start the global MPPT of the photovoltaic array. In this application, when there is a periodic shade for the photovoltaic array, the MPPT controller may obtain the initial multi-peak search start moment based on tracking moments at which a plurality of global MPPs are tracked when there is a periodic shade for the photovoltaic array, and then start the global MPPT of the photovoltaic array in the next MPPT period based on the initial multi-peak search start moment, to further correct the multi-peak search start moment based on a result of the global MPPT of the photovoltaic array, so that the multi-peak search is started in a subsequent MPPT period based on a corrected multi-peak search start moment, to improve effectiveness of tracking the global MPP of the photovoltaic array and improve efficiency and accuracy of the global MPPT of the photovoltaic array.

In some feasible implementations, when obtaining the initial multi-peak search start moment of the global MPPT of the photovoltaic array, the MPPT controller may further obtain a target moment (namely, a moment (Tm−Ts)) that is earlier than Tm by a duration Ts, and use the target moment as the initial multi-peak search start moment (in other words, the initial value of T is Tm−Ts in this case) of the global MPPT of the photovoltaic array. In other words, the MPPT controller may obtain the target moment (Tm−Ts) before Tm, and use the target moment as the initial multi-peak search start moment of the global MPPT of the photovoltaic array. Herein, a time length between the target moment and Tm is Ts. In this application, the MPPT controller may use the moment that is earlier than Tm by the duration Ts as the initial value of the initial multi-peak search start moment. Tm is a median of the E tracking moments, and therefore the effectiveness and applicability of the initial multi-peak search start moment may be ensured, and a probability of tracking the global MPPT of the photovoltaic array may be increased, to ensure efficiency of tracking the global MPP of the photovoltaic array.

S806. Start the global MPPT of the photovoltaic array when the initial multi-peak search start moment in the next MPPT period of the first MPPT period arrives, and obtain the multi-peak search start moment of the global MPPT of the photovoltaic array based on a moment at which the global MPPT of the photovoltaic array is tracked.

S807. Start the global MPPT of the photovoltaic array when the multi-peak search start moment in each MPPT period arrives, and output a working point of the global MPP in each MPPT period to the power converter when the global MPP in each MPPT period is tracked.

In some feasible implementations, after starting a multi-peak search of the photovoltaic array at the moment Tm, the MPPT controller may track, in real time, a peak characteristic of the P-U curve output by the photovoltaic array, to track the global MPP of the photovoltaic array. If tracking the global MPP of the photovoltaic array, the MPPT controller may record the moment (namely, a moment at which the global MPP is generated in the P-U curve output by the photovoltaic array, which may be recorded as Tf for ease of description) at which the global MPPT of the photovoltaic array is tracked, obtain the moment, and use the moment as the multi-peak search start moment (which may be recorded as T=Tf for ease of description) of the global MPPT of the photovoltaic array. Starting from a next period (for ease of description, description may be provided by using a target MPPT period as an example) of the next period (namely, a period in which the multi-peak search start moment is obtained) of the first MPPT period, the MPPT controller may start the global MPPT of the photovoltaic array when the multi-peak search start moment (T=Tf) in each MPPT period arrives, to find the global MPP of the photovoltaic array in a timely manner. When tracking the global MPP in each MPPT period, the MPPT controller may further output the working point of the global MPP in each MPPT period to the power converter, to ensure an energy yield in the photovoltaic system. Operation of the photovoltaic system is simple and the system has high applicability.

In some feasible implementations, when (Tm−Ts) in the next MPPT period of the first MPPT period arrives, the MPPT controller may start a multi-peak search of the photovoltaic array to start the global MPPT of the photovoltaic array, and then when tracking the global MPP of the photovoltaic array, may record the moment (namely, the moment at which the global MPP is generated in the P-U curve output by the photovoltaic array) at which the global MPPT of the photovoltaic array is tracked, obtain the moment, and use the obtained moment as the multi-peak search start moment (which may be recorded as T=Tf for ease of description) of the global MPPT of the photovoltaic array. Starting from the target MPPT period, the MPPT controller may start the global MPPT of the photovoltaic array when the multi-peak search start moment (T=Tf) in each MPPT period arrives, to find the global MPP of the photovoltaic array in a timely manner. Optionally, if tracking no global MPP of the photovoltaic array after the multi-peak search of the photovoltaic array is started at the moment (Tm−Ts) in the next MPPT period of the first MPPT period, the MPPT controller may update the initial multi-peak search start moment T based on a preset start delay duration Tb (in this case, the initial value of T may be updated to T=T+Tb.) until the global MPPT of the photovoltaic array is started at an updated initial multi-peak search start moment and the global MPP of the photovoltaic array is tracked, to find the moment Tf at which the global MPP of the photovoltaic array is tracked. Herein, the initial multi-peak search start moment T is updated based on the preset start delay duration Tb, so that it may be ensured that the initial multi-peak search start moment is closer to an actual multi-peak search start moment at which the global MPP of the photovoltaic array is tracked, to ensure accuracy of a finally obtained multi-peak search start moment. Herein, Tb may be a natural number less than Ts, and values of Tb and Ts may be determined based on an actual application scenario. This is not limited herein. For example, the value of Ts may be 20 minutes, and the value of Tb may be 1 minute. After obtaining Tf, the MPPT controller may start, starting from the next MPPT period (namely, the target MPPT period), the global MPPT of the photovoltaic array when the multi-peak search start moment Tf in each MPPT period arrives, to find the global MPP of the photovoltaic array in a timely manner. When tracking the global MPP in each MPPT period, the MPPT controller may further output the working point of the global MPP in each MPPT period to the power converter, to ensure the energy yield in the photovoltaic system. Operation of the photovoltaic system is simple and the system has high applicability.

In this application, the MPPT controller in the photovoltaic system may obtain the multi-peak search start moment of the global MPPT of the photovoltaic array based on the status of the global MPPT of the photovoltaic array when there is a periodic shade for the photovoltaic array, start the global MPPT of the photovoltaic array when the multi-peak search start moment in each MPPT period arrives, and output the working point of the global MPP in each MPPT period to the power converter when tracking the global MPP in each MPPT period, so that the power converter works at the global MPP. In this way, efficiency and precision of obtaining the multi-peak search start moment of the global MPPT of the photovoltaic array may be improved, and precision of controlling the global MPPT of the photovoltaic array may be improved, to ensure the energy yield in the photovoltaic system. Operation of the photovoltaic system is simple and the system has high applicability.

What is claimed is:

1. A photovoltaic system comprising:
a maximum power point tracking MPPT controller and a power converter connected to each other;
wherein the MPPT controller is configured to: be connected to a photovoltaic array, and track a global maximum power point MPP of the photovoltaic array; and
the MPPT controller is further configured to obtain, when there is a periodic shade for the photovoltaic array, a multi-peak search start moment of a global MPPT of the photovoltaic array based on a status of tracking the global MPP of the photovoltaic array in a target time period, so that when the multi-peak search start moment in each MPPT period arrives, the global MPPT of the photovoltaic array is started, to output a working point of the global MPP of the photovoltaic array to the power converter, wherein the target time period comprises a plurality of MPPT periods.

2. The photovoltaic system according to claim 1, wherein the plurality of MPPT periods comprise a first MPPT period and N second MPPT periods before the first MPPT period, wherein N is a natural number greater than 1;
the MPPT controller is configured to: start the global MPPT of the photovoltaic array when a first multi-peak search start moment in the first MPPT period arrives, and obtain a multi-peak search time period for a periodic shade based on the first multi-peak search start moment when tracking the global MPP of the photovoltaic array; and
the MPPT controller is further configured to obtain, when there is the periodic shade for the photovoltaic array, the multi-peak search start moment of the global MPPT of the photovoltaic array based on a status of tracking the global MPP of the photovoltaic array in the multi-peak search time period in each second MPPT period.

3. The photovoltaic system according to claim 2, wherein the MPPT controller is further configured to obtain the multi-peak search start moment of the global MPPT of the photovoltaic array when a quantity E of second MPPT periods in which the global MPP of the photovoltaic array is tracked is greater than or equal to M, wherein M is a natural number less than N.

4. The photovoltaic system according to claim 3, wherein the MPPT controller is further configured to: obtain E tracking moments, in the E second MPPT periods, at which the global MPP of the photovoltaic array is tracked, and obtain an initial multi-peak search start moment of the global MPPT of the photovoltaic array based on the E tracking moments; and
the MPPT controller is further configured to: start the global MPPT of the photovoltaic array when the initial multi-peak search start moment in a next MPPT period of the first MPPT period arrives, and obtain the multi-peak search start moment of the global MPPT of the photovoltaic array based on a moment at which the global MPP of the photovoltaic array is tracked.

5. The photovoltaic system according to claim 4, wherein the MPPT controller is further configured to obtain the initial multi-peak search start moment of the global MPPT of the photovoltaic array based on a target moment before a median moment Tm of the E tracking moments, wherein
a time length between the target moment and the median moment Tm is a duration Ts.

6. The photovoltaic system according to claim 5, wherein the MPPT controller is further configured to: when starting the global MPPT of the photovoltaic array at the initial multi-peak search start moment in the next MPPT period of the first MPPT period and tracking no global MPPT of the photovoltaic array, update the initial multi-peak search start moment based on a preset start delay duration Tb until the global MPPT of the photovoltaic array is started at an updated initial multi-peak search start moment and the global MPP of the photovoltaic array is tracked, wherein Tb is less than Ts.

7. The photovoltaic system according to claim 6, wherein the MPPT controller is further configured to obtain the multi-peak search start moment of the global MPPT of the photovoltaic array based on a moment, in the next MPPT period of the first MPPT period, at which the global MPP of the photovoltaic array is tracked.

8. The photovoltaic system according to claim 2, wherein the MPPT controller is further configured to obtain the multi-peak search time period for the periodic shade based on a duration Tw before the first multi-peak search start moment and the duration Tw after the first multi-peak search start moment.

9. The photovoltaic system according to claim 1, wherein the photovoltaic system further comprises a combiner box, the photovoltaic array is connected to the power converter by the combiner box, and the power converter is further connected to a load.

10. The photovoltaic system according to claim 9, wherein the photovoltaic system further comprises a direct current bus, the photovoltaic array is connected to the direct current bus by the combiner box, and the direct current bus is connected to the load by using the power converter.

11. The photovoltaic system according to claim 10, wherein the power converter is a photovoltaic inverter, and the load comprises a grid-connected/off-grid junction box, an alternating current load, and/or an alternating current grid.

12. The photovoltaic system according to claim 10, wherein the power converter is a direct current DC/DC converter, and the load comprises a direct current load and/or an energy storage battery.

13. The photovoltaic system according to claim 10, wherein the power conversion module is a DC/DC converter, the photovoltaic array is connected to the DC/DC converter by the combiner box, the DC/DC converter is connected to the load by the direct current bus, and the load comprises a photovoltaic inverter and/or an energy storage battery.

14. A maximum power point tracking MPPT control method for a photovoltaic system, wherein the method is applicable to an MPPT controller in the photovoltaic system, the photovoltaic system further comprises a photovoltaic array and a power converter, the MPPT controller is connected to the photovoltaic array and the power converter, and the method comprises:
  obtaining a status of tracking a global MPP of the photovoltaic array in a target time period, wherein the target time period comprises a plurality of MPPT periods; and
  obtaining, when there is a periodic shade for the photovoltaic array, a multi-peak search start moment of global MPPT of the photovoltaic array based on the status of tracking the global MPP of the photovoltaic array in the target time period, so that when the multi-peak search start moment in each MPPT period arrives, the global MPPT of the photovoltaic array is started, to output a working point of the global MPP of the photovoltaic array to the power converter.

15. The method according to claim 14, wherein the plurality of MPPT periods comprise a first MPPT period and N second MPPT periods before the first MPPT period, wherein N is a natural number greater than 1; and
  obtaining the status of tracking the global MPP of the photovoltaic array in the target time period comprises:
  starting the global MPPT of the photovoltaic array when a first multi-peak search start moment in the first MPPT period arrives, and determining to obtain a multi-peak search time period for a shade based on the first multi-peak search start moment when tracking a first global MPP of the photovoltaic array in the first MPPT period; and
  obtaining a status of tracking the global MPP of the photovoltaic array in the multi-peak search time period in each second MPPT period.

16. The method according to claim 15, wherein obtaining, when there is the periodic shade for the photovoltaic array, the multi-peak search start moment of the global MPPT of the photovoltaic array comprises:
  obtaining a quantity E of second MPPT periods, in each second MPPT period, that comprise the multi-peak search time period in which the global MPP of the photovoltaic array is tracked, and obtaining the multi-peak search start moment of the global MPPT of the photovoltaic array when E is greater than M, wherein M is a natural number less than N.

17. The method according to claim 16, wherein obtaining the multi-peak search start moment of the global MPPT of the photovoltaic array comprises:
  obtaining E tracking moments, in multi-peak search time periods in the E second MPPT periods, at which the global MPP of the photovoltaic array is tracked, and obtaining an initial multi-peak search start moment of the global MPPT of the photovoltaic array based on the E tracking moments; and
  starting the global MPPT of the photovoltaic array when the initial multi-peak search start moment in a next MPPT period of the first MPPT period arrives, and obtaining the multi-peak search start moment of the global MPPT of the photovoltaic array based on a moment at which the global MPPT of the photovoltaic array is tracked.

18. The method according to claim 17, wherein obtaining the initial multi-peak search start moment of the global MPPT of the photovoltaic array based on the E tracking moments comprises:
  obtaining the initial multi-peak search start moment of the global MPPT of the photovoltaic array based on a target moment before a median moment Tm of the E tracking moments, wherein
  a time length between the target moment T and the median moment Tm is a duration Ts.

19. The method according to claim 18, wherein obtaining the multi-peak search start moment of the global MPPT of the photovoltaic array based on the moment at which the global MPPT of the photovoltaic array is tracked comprises:
  obtaining the multi-peak search start moment of the global MPPT of the photovoltaic array based on a moment, in the next MPPT period of the first MPPT period, at which the global MPPT of the photovoltaic array is tracked, and
  when starting the global MPPT of the photovoltaic array at the initial multi-peak search start moment in the next MPPT period of the first MPPT period and tracking no global MPPT of the photovoltaic array, updating the initial multi-peak search start moment based on a preset start delay duration Tb until the global MPPT of the photovoltaic array is started at an updated initial multi-peak search start moment and the global MPP of the photovoltaic array is tracked, wherein Tb is less than Ts.

20. The method according to claim 15, wherein obtaining the multi-peak search time period for the periodic shade based on the first multi-peak search start moment comprises:
obtaining the multi-peak search time period for a periodic shade based on a duration Tw before the first multi-peak search start moment and the duration Tw after the first multi-peak search start moment.

* * * * *

UNITED STATES PATENT AND TRADEMARK OFFICE
CERTIFICATE OF CORRECTION

PATENT NO. : 11,888,322 B2
APPLICATION NO. : 17/853324
DATED : January 30, 2024
INVENTOR(S) : Binjie Cheng It is certified that error appears in the above-identified patent and that said Letters Patent is hereby corrected as shown below:

In the Claims

In Column 27, Line 27, in Claim 10, after "by" delete "using".

In Columns 28-29, Lines 67-1, in Claim 19, delete "multi- peak" and insert -- multi-peak --.

Signed and Sealed this
Twenty-sixth Day of March, 2024

Katherine Kelly Vidal
*Director of the United States Patent and Trademark Office*